United States Patent
Nguyen et al.

(10) Patent No.: US 12,548,558 B2
(45) Date of Patent: Feb. 10, 2026

(54) Mitigating False Positives And/Or False Negatives In Hot Word Free Adaptation Of Automated Assistant

(71) Applicant: GOOGLE LLC, Mountain View, CA (US)

(72) Inventors: Tuan Nguyen, San Jose, CA (US); Gabriel Leblanc, Sunnyvale, CA (US); Tzu-Chan Chuang, San Francisco, CA (US); Qiong Huang, San Jose, CA (US); William A. Truong, San Jose, CA (US); Yixing Cai, San Jose, CA (US); Alexey Galata, San Jose, CA (US); Yuan Yuan, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 346 days.

(21) Appl. No.: 17/579,131

(22) Filed: Jan. 19, 2022

(65) Prior Publication Data

US 2023/0230583 A1   Jul. 20, 2023

(51) Int. Cl.
*G10L 15/08* (2006.01)
*G06F 21/32* (2013.01)
(Continued)

(52) U.S. Cl.
CPC .......... *G10L 15/083* (2013.01); *G06F 21/32* (2013.01); *G06V 40/161* (2022.01);
(Continued)

(58) Field of Classification Search
CPC ......... G10L 15/25; G10L 15/08; G10L 15/00; G10L 15/06; G10L 15/063; G10L 15/065;
(Continued)

(56) References Cited

U.S. PATENT DOCUMENTS 7,028,269 B1   4/2006   Cohen-Solal et al.
8,885,882 B1   11/2014  Mn et al.
(Continued)

FOREIGN PATENT DOCUMENTS

EP   2891954   7/2015
EP   2966644   1/2016
(Continued)

OTHER PUBLICATIONS

Siatras, S. et al., "Visual Lip Activity Detection and Speaker Detection Using Mouth Regions Intensities;" IEEE Transactions on Circuits and Systems for Video Technology; vol. 19, Issue 1; 5 pages; dated Dec. 9, 2008.
(Continued)

*Primary Examiner* — Hai Phan
(74) *Attorney, Agent, or Firm* — Gray Ice Higdon

(57) ABSTRACT

Hot word free adaptation, of one or more function(s) of an automated assistant, responsive to determining, based on gaze measure(s) and/or active speech measure(s), that a user is engaging with the automated assistant. Implementations relate to various techniques for mitigating false positive occurrences of and/or false negative occurrences, of hot word free adaptation, through utilization of personalized parameter(s) for at least some user(s) of an assistant device. The personalized parameter(s) are utilized in determining whether condition(s) are satisfied, where those condition(s), if satisfied, indicate that the user is engaging in hot word free interaction with the automated assistant and result in adaptation of function(s) of the automated assistant.

20 Claims, 8 Drawing Sheets

(51) Int. Cl.
*G06V 40/16* (2022.01)
*G10L 15/06* (2013.01)
*G10L 15/065* (2013.01)
*G10L 15/22* (2006.01)

(52) U.S. Cl.
CPC ............ *G10L 15/065* (2013.01); *G10L 15/22* (2013.01); *G10L 2015/0636* (2013.01); *G10L 2015/088* (2013.01); *G10L 2015/227* (2013.01)

(58) Field of Classification Search
CPC ....... G10L 15/07; G10L 15/016; G10L 15/18; G10L 15/183; G10L 15/20; G10L 15/22; G10L 15/24; G10L 15/26; G10L 15/28; G10L 2015/0631–0638; G10L 2015/221–228
USPC ....... 704/235, 236, 243, 255, 272, 276, 270, 704/270.1
See application file for complete search history.

(56) References Cited

U.S. PATENT DOCUMENTS

| | | |
|---|---|---|
| 9,250,703 B2 | 2/2016 | Hernandez-Abrego et al. |
| 9,263,044 B1 | 2/2016 | Cassidy et al. |
| 9,423,870 B2 | 8/2016 | Teller et al. |
| 9,691,411 B2 | 6/2017 | Scherer et al. |
| 9,832,452 B1 | 11/2017 | Fotland et al. |
| 9,939,896 B2 | 4/2018 | Teller et al. |
| 10,075,491 B2 | 9/2018 | Smus |
| 10,156,900 B2 | 12/2018 | Publicover et al. |
| 10,423,225 B2 | 9/2019 | Suk |
| 10,540,015 B2 | 1/2020 | Li |
| 10,726,521 B2 | 7/2020 | Leong |
| 10,768,693 B2 | 9/2020 | Powderly et al. |
| 10,853,911 B2 | 12/2020 | Leong |
| 10,890,969 B2 | 1/2021 | Yuan et al. |
| 2002/0135618 A1 | 9/2002 | Maes et al. |
| 2004/0193413 A1 | 9/2004 | Wilson et al. |
| 2006/0192775 A1 | 8/2006 | Nicholson et al. |
| 2012/0062729 A1 | 3/2012 | Hart et al. |
| 2012/0295708 A1 | 11/2012 | Hernandez-Abrego et al. |
| 2013/0144616 A1 | 6/2013 | Bangalore |
| 2013/0144629 A1 | 6/2013 | Johnston et al. |
| 2013/0304479 A1 | 11/2013 | Teller et al. |
| 2014/0016837 A1 | 1/2014 | Nechyba et al. |
| 2014/0062862 A1 | 3/2014 | Yamashita |
| 2014/0149754 A1 | 5/2014 | Silva et al. |
| 2014/0247208 A1 | 9/2014 | Henderek et al. |
| 2014/0306874 A1 | 10/2014 | Finocchio et al. |
| 2014/0333414 A1* | 11/2014 | Kursun ................ G06V 40/50 340/5.82 |
| 2014/0337949 A1 | 11/2014 | Hoyos |
| 2014/0361973 A1 | 12/2014 | Raux et al. |
| 2015/0033130 A1 | 1/2015 | Scheessele |
| 2015/0193005 A1 | 7/2015 | Di Censo et al. |
| 2016/0011853 A1 | 1/2016 | Rogers et al. |
| 2016/0026253 A1 | 1/2016 | Bradski et al. |
| 2016/0042648 A1 | 2/2016 | Kothuri |
| 2016/0132290 A1 | 5/2016 | Raux |
| 2016/0203454 A1 | 7/2016 | Kogoshi |
| 2016/0284134 A1 | 9/2016 | Kamhi et al. |
| 2016/0309081 A1 | 10/2016 | Frahm et al. |
| 2016/0328621 A1 | 11/2016 | Negi et al. |
| 2016/0330346 A1 | 11/2016 | Hayashi et al. |
| 2016/0373269 A1 | 12/2016 | Okubo et al. |
| 2017/0026764 A1 | 1/2017 | Rajendran |
| 2017/0160813 A1 | 6/2017 | Divakaran et al. |
| 2017/0169818 A1 | 6/2017 | VanBlon et al. |
| 2017/0289766 A1 | 10/2017 | Scott et al. |
| 2017/0312614 A1 | 11/2017 | Tran et al. |
| 2017/0315825 A1 | 11/2017 | Gordon et al. |
| 2018/0011543 A1 | 1/2018 | Funami |
| 2018/0061400 A1 | 3/2018 | Carbune et al. |
| 2018/0185753 A1 | 7/2018 | Nakagawa et al. |
| 2018/0246569 A1 | 8/2018 | Arakawa et al. |
| 2019/0094981 A1 | 3/2019 | Bradski et al. |
| 2019/0102706 A1 | 4/2019 | Frank et al. |
| 2019/0138268 A1 | 5/2019 | Andersen et al. |
| 2019/0187787 A1 | 6/2019 | White et al. |
| 2019/0199759 A1 | 6/2019 | Anderson et al. |
| 2019/0246036 A1 | 8/2019 | Wu et al. |
| 2019/0294252 A1 | 9/2019 | Li |
| 2019/0304157 A1 | 10/2019 | Amer et al. |
| 2019/0324527 A1 | 10/2019 | Presant et al. |
| 2019/0369748 A1 | 12/2019 | Hindi et al. |
| 2020/0103963 A1 | 4/2020 | Kelly |
| 2020/0104653 A1 | 4/2020 | Solomon et al. |
| 2020/0167597 A1 | 5/2020 | Nguyen et al. |
| 2020/0175292 A1* | 6/2020 | Casado ................ G06V 40/70 |
| 2020/0286484 A1 | 9/2020 | Scanlon |
| 2020/0341546 A1 | 10/2020 | Yuan et al. |
| 2020/0342223 A1 | 10/2020 | Mixter et al. |
| 2020/0349966 A1* | 11/2020 | Konzelmann ........... G06F 3/167 |
| 2020/0380977 A1 | 12/2020 | Unter Ecker |
| 2020/0396533 A1 | 12/2020 | Meiyappan et al. |
| 2021/0089125 A1 | 3/2021 | Yuan et al. |

FOREIGN PATENT DOCUMENTS

| | | |
|---|---|---|
| EP | 3012833 | 4/2016 |
| EP | 3413303 | 7/2020 |
| JP | H1124694 | 1/1999 |
| JP | 2010102235 | 5/2010 |
| JP | 2012242609 | 12/2012 |
| JP | 2014048936 | 3/2014 |
| JP | 2015514254 | 5/2015 |
| JP | 2015135674 | 7/2015 |
| JP | 2016004270 | 1/2016 |
| JP | 2016502137 | 1/2016 |
| JP | 2016502721 | 1/2016 |
| JP | 2016131288 | 7/2016 |
| JP | 2016526211 | 9/2016 |
| JP | 2016212624 | 12/2016 |
| JP | 2017010176 | 1/2017 |
| JP | 2017138476 | 8/2017 |
| JP | 2017138536 | 8/2017 |
| JP | 2019505011 | 2/2019 |
| KR | 20150138109 | 12/2015 |
| WO | 2013162603 | 10/2013 |
| WO | 2014078480 | 5/2014 |
| WO | 2014203495 | 2/2017 |
| WO | 2017002473 | 4/2018 |
| WO | 2018061173 | 4/2018 |
| WO | 2019123425 | 6/2019 |
| WO | 2019212567 | 11/2019 |
| WO | 2021142055 | 7/2021 |

OTHER PUBLICATIONS

European Patent Office; International Search Report and Written Opinion issued in Application No. PCT/US2022/048707; 12 pages; dated Mar. 2, 2023.

European Patent Office; Communication Pursuant to Article 94(3) EPC issue in Application No. 22822730.2; pages; dated Aug. 11, 2025.

* cited by examiner

Mitigating False Positives And/Or False Negatives In Hot Word Free Adaptation Of Automated Assistant

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed. An automated assistant responds to a request by providing responsive user interface output, which can include audible and/or visual user interface output. An automated assistant can additionally and/or alternatively respond to a request by controlling other computing device(s) such as smart device(s) (e.g., smart light(s), smart television(s)).

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some user interface inputs that have been used to invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot words/phrases" or "trigger words/phrases". For example, a particular spoken invocation phrase such as "Hey Assistant," "OK Assistant", and/or "Assistant" can be spoken to invoke an automated assistant.

SUMMARY

Many client devices that facilitate interaction with an automated assistant—also referred to herein as "assistant devices" (i.e., a client device that implements (at least in part) the automated assistant)—enable users to engage in touch-free interaction with the automated assistant. For example, assistant devices often include microphones that allow users to provide vocal utterances to invoke and/or otherwise interact with an automated assistant. Assistant devices described herein can additionally or alternatively incorporate, and/or be in communication with, one or more vision components (e.g., camera(s)), Light Detection and Ranging (LIDAR) component(s), radar component(s), etc.) to facilitate touch-free interactions with an automated assistant.

Implementations disclosed herein relate to hot word free adaptation of one or more function(s) of an automated assistant. Those implementations adapt function(s) of an automated assistant independent of detection of a hot word. Instead, those implementation(s) adapt the function(s) responsive to determining, based at least on processing vision data capture by vision component(s) of the assistant device, that condition(s) are satisfied that indicate a user, captured in the vision data, is intending to engage with the automated assistant via the assistant device. The adaptation of the function(s) can, in various implementations, include initiating certain automated assistant processing that, prior to adaptation, was dormant. For example, the function(s) that are adapted can include the initiation of automatic speech recognition (ASR) (e.g., local ASR at the assistant device), natural language understanding (NLU) (e.g., NLU at the assistant device and/or at remote server(s) based on ASR results from local ASR), fulfillment based on the ASR and/or NLU results (e.g., at the assistant device and/or remote servers), and/or transmission of data to remote server(s) (e.g., transmission of ASR results, audio data, and/or vision data). In many implementations, determining whether the condition(s) are satisfied can be performed entirely locally at the assistant device.

In various implementations, the automated assistant function(s) can be adapted in response to determining, based on processing vision data (e.g., images) and audio data captured by the client device, that a user's gaze is directed at the client device and that the same user is actively speaking. Determining that the same user is actively speaking can be based on determining, using the vision data, that a mouth of the user (captured in the vision data) is moving in a manner indicative of speech. Determining that the same user is actively speaking can additionally or alternatively be based on processing vision data along with temporally aligned audio data to determine that movement of the mouth of the same user is temporally correlated with speech that is captured in the audio data. In some of those various implementations, the function(s) can be adapted further in response to determining that additional condition(s) are satisfied, such as the same user being within a threshold distance of the assistant device and/or the same user being a registered user of the assistant device (e.g., by performing face recognition on the image(s)).

Accordingly, implementations disclosed herein enable interaction of a user with an automated assistant to be initiated and/or guided without the user needing to preface such interaction with utterance of a hot word. This enables reduced user input to be provided by the user (at least due to omission of the hot word), which directly lessens the duration of the interaction and thereby conserves various network resources and/or remote and/or local processing resources that would otherwise be utilized in a prolonged interaction. Moreover, hot words are often unnatural prescribed phrases that are awkward to speak. This awkwardness can add friction to the user-assistant interaction and/or further prolong the interaction.

While hot word free adaptation of an automated assistant achieves various technical benefits, there are drawback(s) that can result from false positive occurrences where it is incorrectly determined to perform hot word free adaptation(s) and/or from false negative occurrences where it is incorrectly determined to not perform hot word free adaptation(s). A false positive occurrence can result from determining satisfaction of condition(s) that indicate a user, captured in vision data, is intending to engage with an automated assistant of an assistant device when, in fact, the user is not intending to engage with the automated assistant. With a false positive occurrence, the function(s) are needlessly adapted, resulting in wasteful utilization of assistant device resource(s), remote server resource(s), and/or network resource(s). A false negative occurrence can result from determining that such condition(s) are not satisfied when, in fact, the user is intending to engage with the automated assistant. With a false negative occurrence, user interaction with the automated assistant is prolonged and the user may need to provide additional user input (e.g., speak a hot word) to actually cause the adaptation of the assistant function(s). Moreover, false negative occurrences and false positive occurrences can erode user confidence in hot word free adaptation, resulting in users electing to disable hot word free capabilities and preventing technical benefits thereof from being achieved.

Implementations disclosed herein recognize that false positive occurrences and/or false negative occurrences can be exacerbated in situations where the same parameters are utilized, for each of multiple users, in determining whether a corresponding user is intending to engage with an automated assistant of an assistant device. As a working example, assume that determining that a user is intending to engage with the automated assistant (and adaptation of function(s) in response) is contingent at least on determining that a user's gaze is directed at the client device and that the same user is actively speaking.

More particularly and continuing with the working example, in determining that the user's gaze is directed at the client device, image frames, that each capture at least the user's eyes, can be processed to determine, for each image frame, a gaze measure that indicates a direction of the gaze in that frame (e.g., an angle relative to a camera that captured the image). Further, the direction of the gaze and, optionally, a distance of the user from the camera, can be used to determine if the gaze in the image is directed within a gaze area defined by a gaze area parameter. The gaze area encompasses the camera and an area around the camera. Determining that the user's gaze is directed at the client device can be contingent on determining that the gaze is directed within the gaze area for one or more image frames. For example, it can be contingent on determining that the gaze is directed within the gaze area for at least a certain quantity of frames and/or for a certain duration as defined by a gaze persistence parameter. For instance, the gaze persistence parameter can define that the gaze must be directed within the gaze area for at least 3 out of 5 consecutive image frames that are processed in determining gaze measures.

Further, and continuing with the working example, in determining that the same user is actively speaking, a sequence of images, that each capture at least the user's mouth, can be processed (e.g., using a trained machine learning model such as a transformer or recurrent neural network), along with a temporally aligned sequence of audio data frames, to generate an active speech measure. The active speech measure reflects whether the images and audio data frames indicate movement of the mouth of the user (whose mouth is captured in the images) is temporally correlated with any speech included in the audio data. For example, the active speech measure can be a value from 0 to 1, with larger values indicating a higher probability of mouth movement being temporally correlated with speech than are lower values. The active speech measure can be compared to an active speech threshold parameter in determining whether the user is actively speaking. Accordingly, in situations where the active speech threshold parameter is correctly selected, active speaking should be determined when the images and audio data capture the user actively speaking. However, active speaking should not be determined when the images capture the user moving their mouth but not speaking (e.g., there is no speech in the audio data or only speech from other user(s)) and/or when the images fail to capture the user moving their mouth.

Still continuing with the working example, when the same gaze area parameter, gaze persistence parameter, and/or active speech threshold parameter are utilized for each of multiple users, false positive occurrences and/or false negative occurrences can be exacerbated. For example, assume a shared assistant device in a home environment with a first user that is a resident of the home, a second user that is also a resident of the home, and a third user that is also a resident of the home. The first user can typically, when engaging in spoken interactions with the shared assistant device, persistently gaze directly at a camera on the top of the shared assistant device, speak loudly, and move their mouth pronouncedly as they speak. The second user can typically, when engaging in spoken interactions with the shared assistant device, persistently gaze at a right edge of the shared assistant device, speak softly, and move their mouth minimally as they speak. The third user can typically, when engaging in spoken interactions with the shared assistant device, frequently shift between gazing directly at the camera of the shared assistant device and gazing beyond the assistant device, speak loudly, and move their mouth pronouncedly as they speak.

If the gaze area parameter, gaze persistence parameter, and active speech threshold parameter are each set restrictively and the same for all users, it can result in false negative occurrences for the second user and the third user. For example, for the second user the restrictive gaze area parameter can at least selectively result in their persistent gaze at the right edge of the shared assistant device being determined to not be in the gaze area defined by the gaze area parameter. Further, for the second user, their soft speaking and/or their minimal mouth movement can at least selectively result in active speech measures that are less indicative of active speech than if the second user had louder speaking and/or more pronounced mouth movement. A restrictive active speech threshold can thus result in determining that the second user is not actively speaking in many situations. As another example, for the third user the restrictive gaze persistence parameter can result in the gaze not being determined to be directed within the gaze area as a result of the third user frequently diverting their gaze to beyond the assistant device.

If the gaze area parameter, gaze persistence parameter, and active speech threshold parameter are instead each set permissively (i.e., non-restrictively) and the same for all users, it can mitigate false negative occurrences for the second user and the third user. However, setting the parameters permissively can result in an increase in false positive occurrences for at least the first user, which has drawback(s) such as those described above.

In view of these and other considerations, implementations disclosed herein further relate to various techniques for mitigating false positive occurrences and/or false negative occurrences through utilization of personalized parameter(s) for at least some user(s) of an assistant device. In those implementations, the personalized parameter(s) for a user are utilized in determining whether the user is engaging in hot word free interaction with the automated assistant. Put another way, the personalized parameter(s) are utilized in determining whether condition(s) are satisfied, where those condition(s), if satisfied, indicate that the user is engaging in hot word free interaction with the automated assistant and result in adaptation of function(s) of the automated assistant.

As one example, and continuing with the working example above, for the second user a personalized gaze area parameter can be used that is more permissive (e.g., defines a larger area) than the gaze area parameter(s) used for the first user and/or the second user (e.g., default gaze area parameter(s) can be used for the first user and/or the second user or alternate personalized gaze area parameter(s)). As another example, and continuing with the working example, for the second user a personalized active speech threshold parameter can additionally or alternatively be used that is more permissive (e.g., defines a lower threshold) that the speech threshold parameter used for the first user (e.g., a default speech threshold parameter or alternate personalized speech threshold parameter can be used for the first user). As yet another example, and continuing with the working example, for the third user, a personalized gaze persistence parameter can be used that is more permissive (e.g., defines lesser persistence) than the gaze persistence parameter(s) used for the first user and/or the third user. As yet a further example, and continuing with the working example, for the first user, personalized parameter(s) can be used that are more restrictive than counterpart parameter(s) used for the second and third user(s) and/or that are more restrictive than default parameter(s). In these and other manners, one or more parameters can be personalized on a per user basis to mitigate the occurrence of false positives and/or false negatives.

In various implementations, the personalized parameter(s), for a user, are generated automatically based on measure(s) generated based on one or more prior interactions between the user and the automated assistant. For example, the prior interactions can include those in which the user invoked the automated assistant by speaking a hot word. Such prior interactions can be considered ground truth interactions for intent of the user to engage the automated assistant, as speaking of the hot word for the assistant, by the user, was detected. Further, such prior interactions can be ascribed to an account of the user using, for example, text-dependent speaker verification (e.g., based on processing corresponding audio data, from the interaction, that captures the speaking of the hot word) and/or facial recognition (e.g., based on processing corresponding vision data from the interaction) to verify that the prior interactions correspond to the account. Despite the user invoking the automated assistant by speaking the hot word in such prior interactions, vision data and/or audio data from such a prior interaction can still be processed to generate gaze measure(s), gaze persistence measure(s), active speech measure(s), and/or other measure(s) for the prior interaction.

Further, the measure(s) from the prior interaction(s) can be analyzed to determine whether a personalized parameter is needed for the user in lieu of a default parameter and/or to generate the personalized parameter for the user. As a particular example, assume the default active speech threshold parameter is 0.8. Further assume that generated active speech measures from the prior interactions are: {0.81, 0.71, 0.73, 0.72, and 0.75}. In some implementations, a personalized active speech threshold parameter can be determined to be needed in response to determining at least a threshold percentage of the generated active speech measures are less than the default active speech threshold parameter. Additionally or alternatively, the personalized active speech threshold parameter can be generated based on one or more of the generated active speech measures. For example, the personalized active speech threshold parameter can be generated as 0.70 to encompass all generated active speech measures, optionally omitting from consideration any statistical outlier(s) (e.g., 0.25 would be omitted if it were included in the generated active speech measures) and/or optionally taking into account a minimum allowed value. As another example, the personalized active speech threshold parameter can be generated so that two standard deviations (or other quantity of standard deviations) of the generated active speech measures are encompassed by the personalized active speech threshold. As yet another example, the personalized active speech threshold parameter can be generated as the median value of the generated active speech measures or as 0.05 less (or other value less) than the median.

Additional and/or alternative personalized parameter(s) can be generated for the user based on the measure(s) of the prior interaction. Further, some of the personalized parameter(s) can be more restrictive than default counterpart parameter(s). Yet further, some default parameter(s) can optionally be utilized for a user when generated measure(s) of the prior interaction indicate the default parameter(s) are appropriate. For example, default parameter(s) can be utilized when they would have resulted in determining engagement based on the generated measure(s) of all of the prior interactions. Moreover, additional and/or alternative prior interactions, between a user and the automated assistant, can be utilized in automatically generating personalized parameter(s) for the user. For example, the prior interaction(s) can additionally or alternatively include enrollment interaction(s) during which the user is instructed, via audible and/or visual user interface output, to look at a corresponding assistant device and speak an automated assistant command. The enrollment interaction(s) can be during an enrollment procedure in which an account for the user is being generated and/or in which an account for the user is being configured for hot word free interaction techniques described herein.

Personalized parameter(s), for a user, can be generated locally at an assistant device. In some implementations, the personalized parameter(s) are specific to the assistant device and personalized parameter(s) for any other assistant device(s) can be generated locally at those assistant device(s) and can vary from the personalized parameter(s) specific to the assistant device. For example, personalized parameter(s) for a given user for a first assistant device located in a kitchen can be generated locally at that first assistant device and can vary from personalized parameter(s) for the same given user for a second assistant device that is located in a living room and that are generated locally at that second assistant device. In some of the implementations where the personalized parameter(s) for a user are specific to an assistant device, the personalized parameter(s) can optionally be securely uploaded to a remote server for secure storage in association with the assistant device. The assistant device can thereafter, if it loses the personalized parameter(s) (e.g., due to a factory reset or an update), retrieve the personalized parameter(s) from the remote server and again locally store and locally utilize the personalized parameter(s). For example, the assistant device can send a request to the remote server, the remote server can identify the personalized parameter(s) based on them being stored in association with the assistant device that transmitted the request (e.g., based on an identifier included in the request), and the remote server can return the identified personalized parameter(s) in response to the request. In some other implementations, the personalized parameter(s) can be shared amongst assistant device(s).

Personalized parameter(s), for a user, are stored in association with an account of the user. Further, the personalized parameters for the user can be used—along with measure(s) generated based on processing vision data and/or audio data and in determining whether the user is engaging in hot word free interaction with the automated assistant—responsive to determining the processed vision data captures the user. For example, the vision data that is processed can include image frames that capture only the user or image frames that are crops, of original image frames, where the crops each capture only the face of the user. One or more of the image frames can be processed to determine that the face, captured in the image frame(s) corresponds to the account of the user. In response, the personalized parameter(s), stored in association with the account, can be used along with measures generated based on processing those image frame(s) and/or other image frame(s) that capture only that face.

In some implementations, in determining that the face, captured by the image frame(s), corresponds to an account of the user, an image embedding is generated based on processing the image frame(s) using a face recognition machine learning model. Further, the image embedding is compared to a pre-stored face embedding for the account or an embedding generated based on an image, of the user's face, pre-stored in association with the account. If the comparison indicates at least a threshold degree of similarity (e.g., a cosine distance or other distance measure between the embeddings satisfies a threshold), the face captured by the image can be determined to correspond to the account. The pre-stored face embedding can be generated, for example, based on image(s) of the user acquired during an enrollment procedure for establishing the account.

As a particular example, assume that two users are in front of an assistant device and that original image frames, captured by the assistant device, capture a face of the first user and a face of the second user. First image frames, that are each crops of the face of the first user from the original image frames, can be processed in generating first measures for determining whether the first user is engaging in hot word free interaction with the automated assistant. Separately, second image frames, that are each crops of the face of the second user from the original image frames, can be processed in generating second measures for determining whether the second user is engaging in hot word free interaction with the automated assistant. In response to determining that the face, captured by the first image frames, corresponds to a first account of the first user, personalized parameter(s) (if any) stored in association with the first account can be utilized in determining whether the first user is engaging in hot word free interaction with the automated assistant. In response to determining that the face, captured by the second image frames, corresponds to a second account of the second user, personalized parameter(s) (if any) stored in association with the second account can be utilized in determining whether the first user is engaging in hot word free interaction with the automated assistant.

Although particular examples are provided above with respect to measures that can be generated and utilized in determining whether the user is engaging in hot word free interaction with the automated assistant, additional and/or alternative measures can be utilized in determining whether the user is engaging in hot word free interaction with the automated assistant. Moreover, in some implementations personalized parameter(s) can optionally additionally or alternatively include personalized parameter(s) for use with those additional or alternative measure(s).

As one non-limiting example, a distance measure can be generated that predicts a distance of the user relative to the assistant device. For example, the distance measure can be generated based on processing image frame(s) (e.g., inferred from a size of the user's head in the image frame(s)). Determining that the user is engaging in hot word free interaction with the automated assistant can further be contingent on the distance measure satisfying a distance threshold parameter. Optionally, a personalized distance threshold parameter can be utilized for a user and generated, for example, based on generated distance measures from prior interaction(s) of the user. As an additional non-limiting example, a pose measure can be generated that predicts a pose of the head and/or body of a user relative to the assistant device. For example, the pose measure can be generated based on processing image frame(s) that capture the user's head and/or body. Determining that the user is engaging in hot word free interaction with the automated assistant can further be contingent on the pose measure satisfying pose threshold parameter(s). Optionally, a personalized pose threshold parameter can be utilized for a user and generated, for example, based on generated pose measures from prior interaction(s) of the user.

As mentioned above, in some implementations the adaptation(s) that occur based on determining that the user is engaging in hot word free interaction with the automated assistant can include the initiation of certain processing of certain sensor data (e.g., audio data, video, image(s), etc.), whereas the certain processing was not being performed prior (i.e., it was dormant prior). For example, prior to an adaptation, the automated assistant can optionally locally minimally process audio data (e.g., in monitoring for occurrence of voice activity, occurrence of an explicit invocation phrase, and/or in generating active speech measure(s)) and/or can temporarily locally buffer audio data. Prior to the adaptation, the automated assistant will "discard" the audio data after the local processing and/or temporary buffering, and without causing the audio data to be processed by one or more additional components of the automated assistant. Such additional components can include, for example, local and/or remote ASR processors, local and/or remote NLU component(s), local and/or remote component(s) that verify a spoken utterance included in the audio data is intended for the automated assistant (also referred to herein as "semantic filtering") and/or is from a certain speaker, such as one that matches a speaker visually identified based on facial recognition (also referred to herein as "text-independent speaker identification/recognition"). However, in response to determining that the user is engaging in hot word free interaction with the automated assistant, the adaptation can include causing audio data to be processed by one or more of the additional component(s). In these and other manners, processing and/or network resources can be reduced by only transmitting and/or performing certain processing of audio data in response to determining occurrence of certain conditions.

Also, for instance, prior to an adaptation, the automated assistant can optionally locally process vision data for only certain purposes such as generating measures, described herein, used in determining whether the user is engaging in hot word free interaction with the automated assistant. Prior to such adaptation, the automated assistant can refrain from certain processing of the vision data such as refraining from transmitting of any vision data to remote automated assistant component(s) and/or refraining from generating response(s) to any gesture(s) of the user captured in such vision data. However, in response to determining the user is engaging in hot word free interaction with the automated assistant, such further processing of the vision data can occur. In these and other manners, processing and/or network resources can be reduced by only transmitting and/or performing certain processing of vision data in response to occurrence of certain conditions.

As mentioned above, in many implementations determining whether the user is engaging in hot word free interaction with the automated assistant is performed entirely locally at the assistant device based on sensor data from vision component(s) of the assistant device (e.g., camera(s)), microphone(s) of the assistant device, and/or other sensor component(s) of the assistant device. Thus, in those implementations, determining whether to adapt automated assistant functions can occur locally at the assistant device and without any sensor data from the assistant device and/or other data from the assistant device being transmitted over network(s) to one or more remote automated assistant component(s). Rather, such transmission(s) can optionally be one of the automated assistant function(s) that are adapted, and can occur only responsive to the local determination to adapt such function(s). In addition to maintaining security of sensor data and/or other local assistant device data by preventing its transmission unless certain conditions are met, such implementations further conserve network resources, and resources of remote devices, through such local determinations. Further, such implementations enable determinations to be made quickly and without the added latency that would otherwise be present due to client-server transmissions. Such reduced latency can likewise reduce the overall duration of the user-assistant interaction.

More generally, various implementations described herein can provide efficiencies in computing resources and communication networks used to implement automated assistants. For example, as will be evident from description herein, aspects of the implementations can produce more selective and/or per-user adaptation of initiation of communication over a data network and corresponding reductions in data traffic over the network. The more selective initiation of network communication, e.g., from an assistant device, can further lead to more efficient usage of computing resources at a remote system with which the communication is initiated, since various potential communications from the assistant device are filtered out before any contact with the remote system is initiated. The efficiency improvements in usage of data networks and computing resources on remote systems can lead to significant savings in terms of power usage by transmitters and receivers in the network, as well as in terms of memory operations and processing usage at the remote system. Corresponding effects can also be experienced at the assistant device. These effects, particularly over time and with the ongoing operation of the automated assistant, allow significant additional capacity to be experienced in the network and in the computing apparatus as a whole, including the devices and systems which run the assistant. This additional capacity can be used for further communication in the data network, whether assistant-related or not, without the need to expand network capability e.g. through additional or updated infrastructure, and additional computing operations in the computing apparatus. Other technical improvements will be evident from the description herein.

In some implementations, in generating one or more measures described herein, trained machine learning model(s) (e.g., neural network model(s)) that are stored locally on the assistant device are utilized by the assistant device to at least selectively process at least portions of sensor data from sensor component(s) of the client device (e.g., image frames from camera(s) of the client device, audio data from microphone(s) of the device). For example, in response to detecting presence of one or more users (e.g., via a presence sensor), the assistant device can process, for at least a duration (e.g., for at least a threshold duration and/or until presence is no longer detected) at least portion(s) of vision data and/or audio data utilizing locally stored machine learning model(s) in generating measure(s) described herein. The client device can detect presence of one or more users using a dedicated presence sensor (e.g., a passive infrared sensor (PIR)), using vision data and a separate machine learning model (e.g., a separate machine learning model trained solely for human presence detection), and/or using audio data and a separate machine learning model (e.g., VAD using a VAD machine learning model).

In some implementations where local machine learning model(s) are utilized in generating measure(s), different model(s) can be utilized, with each being utilized in generating a different subset of the measure(s). In some versions of those implementations, one or more "upstream" models (e.g., object detection and classification model(s)) can be utilized to detect portions of vision data (e.g., image(s)) that are likely a face, likely eye(s), likely a mouth, etc.—and those portion(s) processed using a respective "downstream" machine learning model. For example, face and/or eye portion(s) of an image can be detected using the upstream model, and processed using a gaze machine learning model in determining gaze measure(s). Also, for example, face and/or mouth portion(s) of an image can be detected using the upstream model, and processed by an active speech machine learning model in determining active speech measure(s).

Some implementations disclosed herein include one or more computing devices that include one or more processors such as central processing unit(s) (CPU(s)), graphics processing unit(s) (GPU(s)), and/or tensor processing unit(s) (TPU(s)). One or more of the processors are operable to execute instructions stored in associated memory, and the instructions are configured to cause performance of any of the methods described herein. The computing devices can include, for example, assistant devices with microphone(s), at least one display, vision component(s), and/or other sensor component(s). Some implementations also include one or more non-transitory computer readable storage media storing computer instructions executable by one or more processors to perform any of the methods described herein.

DETAILED DESCRIPTION

Figure 1:
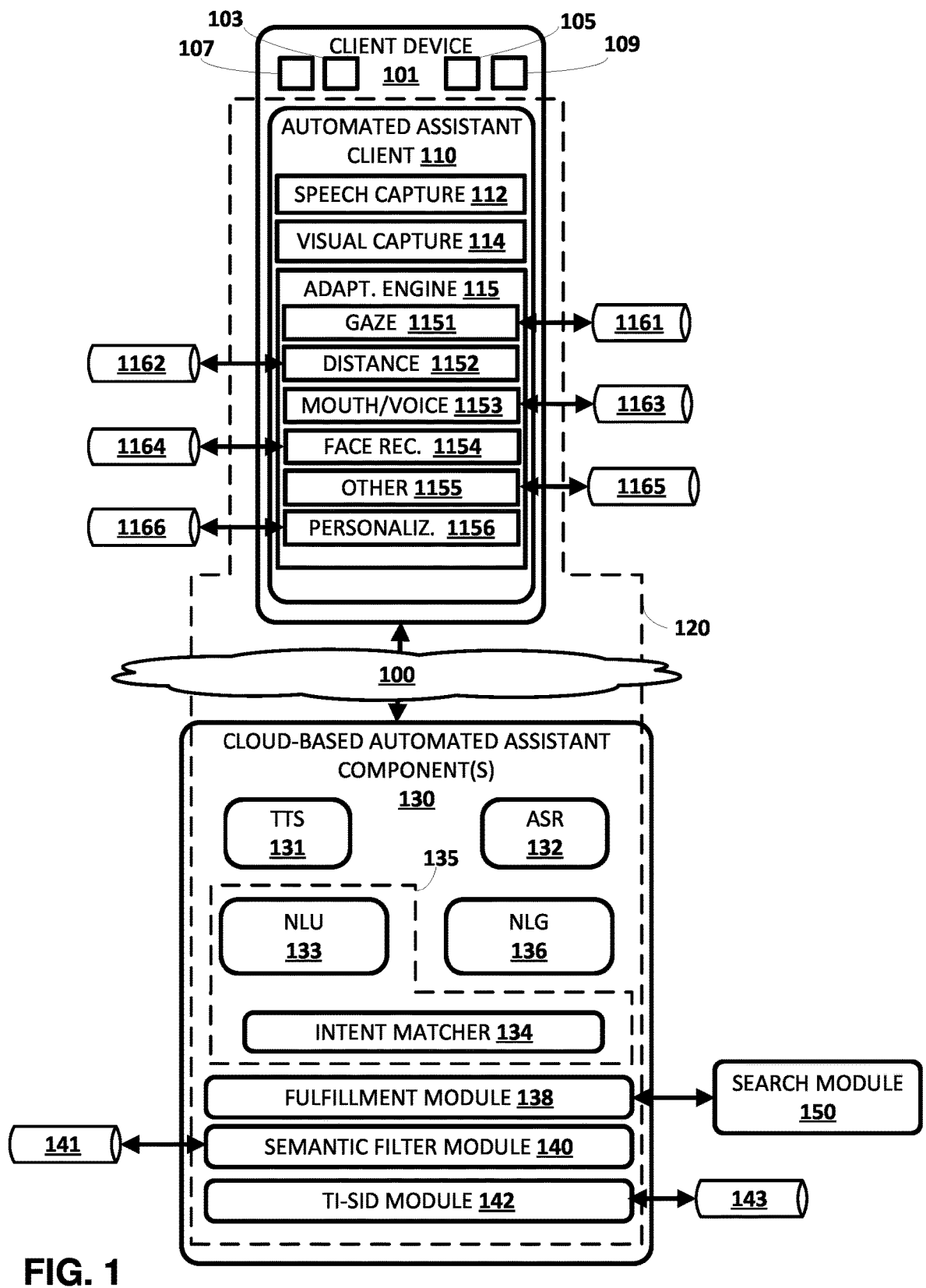
FIG. 1 is a block diagram of an example environment in which implementations disclosed herein may be implemented.

FIG. 1 illustrates an example environment in which techniques disclosed herein can be implemented. The example environment includes a client device 101 that at least selectively executes an automated assistant client 110. The term "assistant device" is also used herein to reference a client device 101 that at least selectively executes an automated assistant client 110. One or more cloud-based automated assistant components 130 can be implemented on one or more computing systems (collectively referred to as a "cloud" computing system) that are communicatively coupled to client device 101 via one or more local and/or wide area networks (e.g., the Internet) indicated generally at 100. The cloud-based automated assistant components 130 can be implemented, for example, via a cluster of high-performance servers.

In various implementations, an instance of an automated assistant client 110, by way of its interactions with one or more cloud-based automated assistant components 130, may form what appears to be, from a user's perspective, a logical instance of an automated assistant 120 with which the user may engage in a human-to-computer interactions (e.g., spoken interactions, gesture-based interactions, and/or touch-based interactions). One instance of such an automated assistant 120 is depicted in FIG. 1 in dashed line. It thus should be understood that each user that engages with an automated assistant client 110 executing on a client device 101 may, in effect, engage with his or her own logical instance of an automated assistant 120. For the sake of brevity and simplicity, the term "automated assistant" as used herein as "serving" a particular user will refer to the combination of an automated assistant client 110 executing on a client device 101 operated by the user and optionally one or more cloud-based automated assistant components 130 (which may be shared amongst multiple automated assistant clients 110). It should also be understood that in some implementations, automated assistant 120 may respond to certain requests from any user regardless of whether the user is actually "served" by that particular instance of automated assistant 120.

The client device 101 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, client device 101 can optionally take the form of an assistant device primarily designed to facilitate interactions between users and automated assistant 120 (e.g., a stand-alone interactive device with speaker(s), microphone(s), camera (and/or other vision component(s)), and a display).

Client device 101 can be equipped with one or more vision components 107 having one or more fields of view. Vision component(s) 107 can take various forms, such as monographic cameras, stereographic cameras, a LIDAR component, a radar component, etc. The one or more vision components 107 may be used, e.g., by a visual capture module 114, to capture vision frames (e.g., image frames (still images or video)) of an environment in which client device 101 is deployed. Client device 101 can also be equipped with one or more microphones 109. Speech capture module 112 can be configured to capture user speech and/or other audio data captured via microphone(s) 109.

Adaptation engine 115 processes vision data captured by visual capture module 114 and/or audio data captured by speech capture module 112 in generating one or more measures described herein. Moreover, adaptation engine 115 determines, based on generated measure(s), whether the user is engaging in hot word free interaction with the automated assistant 120 and, if so, causes adaptation of processing performed by the automated assistant 120, such as processing performed by the automated assistant client 110 and/or by the cloud-based automated assistant component(s) 130. Such adaptation can include, for example, adapting of sensor data processing by the client device 101 (e.g., by one or more components of the automated assistant client 110) and/or by one or more cloud-based automated assistant component(s) 130. For example, the adapting can include initiating certain sensor data processing that was dormant prior to the adapting. Adaptation engine 115, in determining, based on generated measure(s), whether the user is engaging in hot word free interaction with the automated assistant, also at least selectively utilizes one or more personalized parameters, for the user, as determined by personalization engine 1156 (described in more detail herein).

Client device 101 can also include one or more presence sensors 105 and/or one or more displays 103 (e.g., a touch-sensitive display). Display(s) 103 can be one of the user interface output component(s) through which user interface output is rendered in various implementations. Display(s) 103 can further be one of the user interface output component(s) through which visual portion(s) of a response, from automated assistant client 110, is rendered. Presence sensor(s) 105 can include, for example, a PIR and/or other passive presence sensor(s). In various implementations, one or more component(s) and/or function(s) of the automated assistant client 110 can be initiated responsive to a detection of human presence based on output from presence sensor(s) 105. For example, visual capture module 114 and/or speech capture module 112 can be activated only responsive to a detection of human presence, and can optionally be deactivated responsive to no longer detecting human presence. Also, for example, vision component(s) 107 and/or microphone(s) 109 can be activated only responsive to a detection of human presence, and can optionally be deactivated responsive to no longer detecting human presence. As yet another example, one or more (e.g., all) modules of adaptation engine 115 can be activated only responsive to a detection of human presence, and can optionally be deactivated responsive to no longer detecting human presence.

In FIG. 1, adaptation engine 115 includes gaze module 1151, distance module 1152, mouth/voice module 1153, face recognition module 1154, one or more other module(s) 1155, and a personalization module 1156.

Adaptation engine 115 utilizes data from one or more of the modules 1151-1156 in determining whether to adapt one or more aspect(s) of the automated assistant 120. For example, adaptation engine 115 can, before initiating transmission of certain data (e.g., audio data detected at client device 101, text recognized from audio data locally at client device 101, and/or NLU data derived from the recognized text locally at client device 101) to cloud-based automated assistant component(s) 130 and/or before performing certain local processing (e.g., local ASR processing of audio data and/or local NLU processing based on local ASR results), require that certain condition(s) be determined to be satisfied. For instance, a condition can include that gaze measure(s), generated by gaze module 1151, indicate that a user's gaze is directed to the assistant device 101 and/or is persistently directed to the assistant device 101 (e.g., directed for at least X duration and/or for Y of Z analyzed image frames). In various implementations, adaptation engine 115 can, in determining whether the gaze measure(s) indicate that a user's gaze is directed to the assistant device 101, use personalized gaze parameter(s), for the user, determined by personalization module 1156. Also, for instance, a condition can additionally include that active speech measure(s), generated by mouth/voice module 1153, indicate that the same user (whose gaze is determined to be directed at the assistant device 101) is actively speaking. In various implementations, adaptation engine 115 can, in determining whether the active speech measures indicate whether the user is actively speaking, use personalized active speech parameter(s), for the user, determined by personalization module 1156. Condition(s) can additionally or alternatively include that distance measure(s), generated by distance module 1152, indicate that the same user is within a threshold distance of the assistant device. In various implementations, adaptation engine 115 can, in determining whether the distance measure(s) indicate whether the user is within the threshold distance, use personalized distance parameter(s), for the user, determined by personalization module 1156. Condition(s) can additionally or alternatively include that data provided by face recognition module 1154 indicates that the same user is a registered user of the assistant device 101 (e.g., has an account stored on and/or in association with the assistant device 101).

Gaze module 1151 processes, using one or more gaze model(s) 1161, vision data from visual capture module 114 to generate gaze measure(s) that indicate whether a user's gaze is directed to the client device 101. As described herein, in some implementations the gaze module 1151 can process only human and/or face region(s) of vision data based on detection of those region(s) by an upstream module (which can be one of the other modules 1155) using an upstream detection and classification model (which can be one of the other models 1165 utilized by the other module(s) 1155).

In some implementations, gaze module 1151 generates, for each processed frame of vision data (e.g., image frame(s) that are each a crop of a respective user's face or eyes), a gaze measure that indicates a direction of the gaze in that frame. For example, each gaze measure can be a respective angle relative to a vision component that captured the frame of vision data. In some of those implementations, the adaptation engine 115 uses the direction, indicated by the gaze measure, and optionally a distance of the user from the client device 101 (e.g., as determined by distance module 1152), to determine if the gaze in the frame is directed within a gaze area defined by a gaze area parameter. The gaze area parameter can be a default gaze area parameter or can be one that is personalized to the user whose eyes are captured in the frame. For example, the personalized gaze parameter can be provided, by the personalization module 1156 and for use in conjunction with the frame, based on it being associated with a particular account and the face recognition module 1154 indicating that the frame captures a user corresponding to the particular account.

In some implementations, gaze module 1151 additionally or alternatively generates, for each processed frame of vision data, a gaze measure that indicates a probability (e.g., a value from 0 to 1) of whether the frame includes a directed gaze. In such implementations, the gaze model(s) 1161 utilized can be, for example, a model trained based on training examples that include, as training example input, vision frame(s) (e.g., an image) and, as training example output, an indication of whether the image includes a directed gaze. For example, the training example output can be a single value that indicates whether directed gaze is present. For example, the single value can be a "0" when no directed gaze is present, a "1" when a gaze is present that is directed directly at, or within 5 degrees of (or other range, which may be dependent on a size of display 103). In some of those implementations, the adaptation engine 115 determines whether a directed gaze is present based on comparing the probability to a gaze measure threshold. The gaze measure threshold can be a default gaze measure threshold parameter or can be one that is personalized to the user whose eyes are captured in the frame. For example, the personalized gaze measure threshold parameter can be provided, by the personalization module 1156 and for use in conjunction with the frame, based on it being associated with a particular account and the face recognition module 1154 indicating that the frame captures a user corresponding to the particular account.

In various implementations, the adaptation engine 115 determines that a user's gaze is directed at the client device 101 only when gaze measure(s) for that user indicate gaze (e.g., direction of gaze is within a gaze area of a gaze area parameter or gaze measure satisfies a gaze measure threshold) for at least a certain quantity of image frames and/or a for certain duration as defined by a gaze persistence parameter. For instance, the gaze persistence parameter can define that the gaze must be directed within the gaze area for at least 65% (or other threshold percentage) consecutive image frames that are processed in determining gaze measures. The gaze persistence parameter can be a default gaze persistence parameter or can be one that is personalized to the user whose eyes are captured in the frame.

The mouth/voice module 1153 uses one or more mouth/voice machine learning models 1163 for generating active speech measure(s) that indicate whether a user's mouth is moving and/or whether, for a user, there is co-occurrence of mouth movement and voice activity. As described herein, in some implementations the mouth/voice module 1153 can process only human and/or face region(s) of vision data based on detection of those region(s) by an upstream module using an upstream detection and classification model.

In some implementations, the mouth/voice module 1153 generates only active speech measure(s) (e.g., one or more probabilities) that indicate whether a user's mouth is moving. In some implementations, the mouth/voice module 1153 additionally or alternatively generates active speech measure(s) that indicate whether there is co-occurrence of mouth movement and voice activity (e.g., whether there is mouth movement that temporally aligns with spoken output captured in audio data). In some of those implementations, the mouth/voice machine learning model 1163 that is utilized can be, for example, a neural network model, such as a transformer model or an RNN model that includes one or more memory layers. For example, the machine learning model can be a model trained to process vision data (e.g., vision data that includes a face region of the user) from visual capture module 114 and audio data from speech capture module 112, to generate an active speech measure that is a probability (a confidence metric) of whether the user captured in the vision data is actually speaking.

Training of such a machine learning model can be based on training examples that include, as training example input, a sequence of vision frames (e.g., sequence of images that include only face regions of a user) and a sequence of audio data frames. The sequence of audio data frames can temporally overlap with the sequence of vision frames, but the sequence of vision frames can optionally be of a different duration (e.g., shorter duration) than the sequence of audio data frames. The training examples can further include, as training example output, an indication of whether the sequences include mouth movement in combination with voice activity from the mouth that is moving. In other words, an indication of whether the user whose face is captured by the sequence of images is speaking. For example, the training example output can be a single value that indicates whether the user whose face is captured by the sequence of images is speaking. For instance, the single value can be a "0" if not, and a "1" if so. It is noted that such a model, trained on both vision data and overlapping audio data, can distinguish between: (1) voice activity that co-occurs with mouth movement and is the result of the mouth movement; and (2) voice activity that is not from the mouth movement, but just happens to co-occur with non-speaking mouth movement. For example, training examples can include those with training example input that includes non-speaking mouth movement in the vision data, and voice activity in the audio data (e.g. voice activity from another user, from a television, and/or from other source(s))—and that include training example output that indicates that the user whose face is captured by the sequence of images is not speaking.

The adaptation engine 115 determines whether active speech is present based on comparing the active speech measure(s) to an active speech measure threshold. The active speech measure threshold can be a default active speech measure threshold parameter or can be one that is personalized to the user whose mouth or face are captured in the frames. For example, the personalized active speech measure threshold parameter can be provided, by the personalization module 1156 for use in conjunction with the frames, based on it being associated with a particular account and the face recognition module 1154 indicating that the frames capture a user corresponding to the particular account.

Distance module 1152 processes vision data from visual capture module 114, and/or other sensor data, to generate a distance measure that indicates an estimated distance of a user. As described herein, in some implementations the distance module 1152 can process only human and/or face region(s) of vision data based on detection of those region(s) using an upstream detection and classification model. The distance module 1152 can optionally use one or more distance machine learning models 1162 in generating distance measures. Such a machine learning model can be, for example, a neural network model, such as a convolutional neural network (CNN) model. Training of such a CNN model can be based on training examples that include, as training example input, vision frame(s) (e.g., an image that includes only face and/or body regions of a single user) and, as training example output, value(s) that indicate a ground truth distance of the user. For instance, the training example output can be a one-hot vector, with the values of the vector each corresponding to a different distance (or range of distances), and the "hot" vector indicating a ground truth distance (or distance range). In other implementations, the distance module 1152 can optionally determine distance without direct utilization of a distance machine learning model 1162. For example, the distance module 1152 can be provided with vision data that includes only a face region determined to correspond to a user. Further, the distance module 1152 can estimate the distance of the user based on a distance between eyes of the user in the vision data (the location of the eyes can optionally be indicated by the upstream model), a head size of the user in the vision data, and/or other attribute(s) of the user in the vision data.

The adaptation engine 115 can determine whether a user is within a threshold distance of the client device 101 by comparing the distance measure(s) to a distance measure threshold. The distance measure threshold can be a default distance measure threshold parameter or can be one that is personalized to the user whose face or body are captured in the frames. For example, the personalized distance measure threshold parameter can be provided, by the personalization module 1156 and for use in conjunction with the frame, based on it being associated with a particular account and the face recognition module 1154 indicating that the frames capture a user corresponding to the particular account.

The face recognition module 1154 can use one or more face recognition machine learning models 1164 to determine whether there is an account associated with a face detected in vision data and, if so, to provide an indication of the account to at least personalization module 1156. For example, the indication of the account can be provided to personalization module 1156 to enable the personalization module 1156 to determine personalized parameter(s) (if any) that are stored in association with the account. The determined personalized parameter(s) can then be used by the adaptation engine 115 in determining whether measure(s) (e.g., generated by module(s) 1151, 1152, and/or 1153) satisfy condition(s) for adapting assistant function(s). As described herein, in some implementations the face recognition module 1154 can process only human and/or face region(s) of vision data based on detection of those region(s) using an upstream detection and classification model.

The face recognition module 1154 can optionally use one or more face recognition machine learning models 1164. Such a machine learning model can be for example, a neural network model, such as a CNN model and/or RNN model. In various implementations, image frame(s) are processed using the face recognition machine learning model(s) 1164 to generate one or more face embeddings, and the face embedding(s) are compared to locally stored embedding(s) for one or more user accounts/profiles registered with the client device 101. In some implementations, adapting one or more function(s), by the adaptation engine 115, can be contingent on the face recognition module 1154 determining a corresponding user is a recognized user (e.g., one registered with the automated assistant client 110). In some additional or alternative implementations, the account identifier associated with the recognized face can be compared to an account identifier determined based on text-independent speaker identification that is based on processing of audio data that captures a spoken utterance. In some of those implementations, certain processing and/or provisioning of a response to the spoken utterance can be contingent on the comparison indicating the same account identifiers. In these and other manners, it can be verified that the spoken utterance is provided by the same user that is also providing the directed gaze (as the face recognition can be performed on the user providing the directed gaze). This can prevent inadvertently generating and/or provisioning of a response to a spoken utterance that is from a user (or other source) that is not the user providing the directed gaze. The text-independent speaker identification can be performed by text-independent speaker identification (TI-SID) module 142 (described herein) which can be implemented at the cloud-based automated assistant component(s) 130, or optionally at the client device 101 itself.

Other module(s) 1155 can determine occurrence of one or more other attribute(s), optionally utilizing one or more other machine learning models 1165. As one non-limiting example, other module(s) 1155 can include a face detection module, that detects face(s) in vision data frames, and can use an object detection model of other machine learning model(s) 1165. The detected face(s) can be used to generate vision data frames that are each a crop, of an underlying initial vision data frame, of a corresponding face. Such cropped vision data frames can be the ones processed by one or more of modules 1151, 1152, 1153, and 1154.

Personalization module 1156 can, for each of one or more accounts stored in association with automated assistant client 110, at least selectively generate one or more personalized parameters. The personalization module 1156 can store, in personalized parameters storage 1166 (e.g., ROM or RAM local to the client device 101) the personalized parameter(s) for each account and store them in association with the account (e.g., define a mapping between the personalized parameter(s) and an identifier of the account). The personalization module 1156 can provide personalized parameter(s) to adaptation engine 115 for use by adaptation engine 115 as described herein. In some implementations, the personalization module 1156 generates personalized parameter(s) for an account automatically and does so based on one or more prior interactions, with the automated assistant 120, determined to have been performed by a user corresponding to the user account.

As one non-limiting example of adapting processing by adaptation engine 115, prior to adaptation engine 115 determining satisfaction of condition(s), ASR processing may not be performed at the client device 101 or any ASR processing results may only be temporarily buffered locally at the client device 101 (i.e., without local NLU processing of the ASR processing results or transmission of the ASR processing results to the cloud-based automated assistant component(s) 130). However, in response to determining the condition(s) are satisfied, the adaptation engine 115 can cause the local ASR processing to be performed (e.g., on temporarily buffered audio data and/or continuing audio data from a stream), cause local NLU processing of the ASR processing results to be performed, and/or cause ASR results and/or NLU results to be transmitted to cloud-based automated assistant component(s) 130. Further, the automated assistant client 110 or the cloud-based automated assistant component(s) 130 can fulfill a corresponding spoken request based on ASR processing results and/or NLU processing results. Thus, the need for the user to speak an explicit invocation phrase (e.g., "OK Assistant") in order to cause a spoken utterance of the user to be fully processed by the automated assistant 120 can be obviated. For instance, rather than the user needing to speak "OK Assistant, what's today's forecast" to obtain today's forecast, the user could instead: look at the client device 101, and speak only "what's today's forecast" during or temporally near (e.g., within a threshold of time before and/or after) looking at the client device 101. Also, for instance, rather than the user needing to speak "OK Assistant, open the garage door" to open his/her garage, the user could instead: look at the client device 101, and speak only "open the garage door" during or temporally near (e.g., within a threshold of time before and/or after) looking at the client device 101.

In some implementations, additional module(s) of the automated assistant client 110 can be provided. For example, additional module(s) can include a local ASR module that processes captured audio data, using an ASR model, to generate recognition(s) of a spoken utterance captured by the audio data. As another example, additional module(s) can include a local NLU module that processes ASR result(s) (e.g., a best recognition) and/or contextual data to generate NLU data that can include a structured semantic interpretation of the ASR results. As yet another example, additional module(s) can include a local fulfillment module that processes ASR results and/or NLU data to locally generate a response and/or perform other fulfillment(s) based on the natural language processing. In various implementations, the local speech processing, local natural language processing, and/or local fulfillment generation can be function(s) that are adapted by the adaptation engine 115. For example, local speech processing, local natural language processing, and/or local response generation can be dormant until the adaptation engine 115 determines one or more attribute(s) are occurring.

Cloud-based automated assistant components 130 can include one or more modules that complement any local module counterparts of automated assistant client and/or that are provided in lieu of any local module counterparts.

Cloud-based ASR module 132 can be configured to leverage the virtually limitless resources of the cloud to convert audio data captured by speech capture module 112 into text, which may then be provided to intent understanding module 135.

Cloud-based TTS module 131 can be configured to leverage the virtually limitless resources of the cloud to convert textual data (e.g., natural language responses formulated by automated assistant 120) into computer-generated speech output. In some implementations, TTS module 131 can provide the computer-generated speech output to client device 101 to be output directly, e.g., using one or more speakers. In other implementations, textual data (e.g., natural language responses) generated by automated assistant 120 may be provided to client device 101, and a local TTS module of client device 101 can then convert the textual data into computer-generated speech that is output locally.

Automated assistant 120 (e.g., cloud-based automated assistant components 130) can include an intent understanding module 135, the aforementioned TTS module 131, the aforementioned ASR module 132, and other components that are described in more detail herein. In some implementations, one or more of the modules and/or modules of automated assistant 120 may be omitted, combined, and/or implemented in a component that is separate from automated assistant 120. In some implementations one or more of the components of automated assistant 120, such as intent understanding module 135, TTS module 131, ASR module 132, etc., may be implemented at least on part on client device 101 (e.g., in combination with, or to the exclusion of, the cloud-based implementations).

NLU module 133 of intent understanding module 135 processes natural language input generated by user(s) via client device 101 and may generate annotated output (e.g., in textual form) for use by one or more other components of automated assistant 120. For example, the NLU module 133 can process recognized text from ASR, of a spoken utterance, performed at the client device 101 and/or at the cloud-based automated assistant component(s) 130. The generated annotated output includes one or more annotations of the natural language input and one or more (e.g., all) of the terms of the natural language input.

In some implementations, the NLU module 133 is configured to identify and annotate various types of grammatical information in natural language input. In some implementations, the NLU module 133 may additionally and/or alternatively include an entity tagger (not depicted) configured to annotate entity references in one or more segments such as references to people, organizations, locations, and so forth. In some implementations, the NLU module 133 can additionally and/or alternatively include a coreference resolver (not depicted) configured to group, or "cluster," references to the same entity based on one or more contextual cues. In some implementations, one or more components of the NLU module 133 can rely on annotations from one or more other components of the NLU module 133.

Intent understanding module 135 can also include an intent matcher 134 that is configured to determine an intent of a user engaged in an interaction with automated assistant 120. While depicted separately from NLU module 133 in FIG. 1, in other implementations, intent matcher 134 may be an integral part of NLU module 133 (or more generally, of a pipeline that includes natural language processor 133). In some implementations, NLU module 133 and intent matcher 134 may collectively form the aforementioned intent understanding module 135.

Intent matcher 134 can use various techniques to determine an intent of the user and, optionally, value(s) for slot(s)/parameter(s) of the intent, e.g., based on output from NLU module 133 (which may include annotations and terms of the natural language input) and/or based on other contextual data. In some implementations, intent matcher 134 may have access to one or more databases (not depicted) that include, for instance, a plurality of mappings between grammars and responsive actions (or more generally, intents), visual cues and responsive actions, and/or touch inputs and responsive actions. In addition to or instead of grammars, in some implementations, intent matcher 134 can employ one or more trained machine learning models, alone or in combination with one or more grammars, visual cues, and/or touch inputs. These trained machine learning models can also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 130. One kind of user intent that may be identified by intent matcher 134 is to engage a third party application. For example, automated assistant 120 may provide access to an application programming interface ("API") to a pizza delivery service. A user may invoke automated assistant 120 and provide a command such as "I'd like to order a pizza." Intent matcher 134 may map this command to a grammar that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 101) natural language output that solicits parameters for the slots.

Fulfillment module 138 can be configured to receive the predicted/estimated intent that is output by intent matcher 134, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 138. In some implementations, fulfillment module 138 can additionally or alternatively at least selectively operate directly on recognized text from ASR results. For example, some recognized text can be mapped directly to corresponding action(s) and/or response(s) for the recognized text, and fulfillment module 138 can utilize the mapping in determining a fulfillment based directly on recognized text.

Fulfillment information can take various forms because intents can be fulfilled in a variety of ways. Suppose a user requests pure information, such as "Where were the outdoor shots of 'The Shining' filmed?" The intent of the user can be determined, e.g., by intent matcher 134, as being a search query. The intent and content of the search query may be provided to fulfillment module 138, which as depicted in FIG. 1 can be in communication with one or more search modules 150 configured to search corpuses of documents and/or other data sources (e.g., knowledge graphs, etc.) for responsive information. Fulfillment module 138 can provide data indicative of the search query (e.g., the text of the query, a reduced dimensionality embedding, etc.) to search module 150. Search module 150 can provide responsive information, such as GPS coordinates, or other more explicit information, such as "Timberline Lodge, Mt. Hood, Oregon." This responsive information can form part of the fulfillment information generated by fulfillment module 138.

Additionally or alternatively, fulfillment module 138 can be configured to receive, e.g., from intent understanding module 135, a user's intent and any slot values provided by the user or determined using other means (e.g., GPS coordinates of the user, user preferences, etc.) and trigger a responsive action. Responsive actions can include, for instance, controlling a smart device, ordering a good/service, starting a timer, setting a reminder, initiating a phone call, playing media, sending a message, initiating a routine of multiple actions, etc. In some such implementations, fulfillment information may include slot values associated with the fulfillment, confirmation responses (which may be selected from predetermined responses in some cases), etc.

Natural language generator 136 can be configured to generate and/or select natural language output (e.g., words/phrases that are designed to mimic human speech) based on data obtained from various sources. In some implementations, natural language generator 136 may be configured to receive, as input, fulfillment information associated with fulfillment of an intent, and to generate natural language output based on the fulfillment information. Additionally or alternatively, natural language generator 136 can receive information from other sources, such as third party applications, which it may use to compose natural language output and/or other content for rendering to the user via automated assistant client 110.

Semantic filter module 140 can determine whether a spoken utterance is intended for the assistant 120. The fulfillment module 138 can utilize output from semantic filter module 140 in determining whether to generate and/or provide a response responsive to a spoken utterance. For example, the semantic filter module 140 can provide a confidence metric that indicates likelihood that the spoken utterance is intended for the assistant 120, and the fulfillment module 138 can determine whether to generate and/or provide a response based on the confidence metric from semantic filter module 140. The confidence metric from semantic filter module 140 can optionally be considered in combination with one or more other confidence metrics, such as metric(s) from adaptation engine 115 and/or TI-SID module 142. Although semantic filter module 140 is illustrated in FIG. 1 as being implemented by the cloud-based automated assistant component(s) 130, in various implementations it can additionally or alternatively be implemented as one of the modules of adaptation engine 115, and utilized in determining whether to adapt one or more assistant functions.

In some implementations, the semantic filter module 140 utilizes one or more semantic machine learning models 141 in determining whether a spoken utterance is intended for the assistant 120. In some of those implementations, the semantic machine learning model(s) 141 can process audio data corresponding to a spoken utterance, text output from the ASR module 132, and/or output from the intent understanding module 135 in determining a confidence metric that a spoken utterance and/or detected gesture is intended for the assistant 120. Generally, for spoken utterances that have corresponding text and/or NLU output that are atypical (or non-occurring) for assistant inputs, the confidence metric should be low. For example, if the text does not conform to any patterns for assistant input, the confidence metric should be low. Additionally or alternatively, if the NLU output would result in no assistant response, or a "punt" response or merely a "personality" response, the confidence metric should be low. Moreover, the audio data itself can indicate whether the input is intended as an assistant input as user's often speak with different voice attribute(s) (e.g., inflection, tone, cadence) when speaking to an assistant device (as compared to those voice attribute(s) when speaking to another human).

TI-SID module 142 processes, using TI-SID machine learning model 143, audio data that contains a spoken utterance to determine if the spoken utterance is from the same user that adaptation engine 115 determined is engaging in hot word free interaction with the automated assistant. For example, TI-SID module 142 can process audio data that captures the spoken utterance, using a TI-SID model, to generate a TI-SID embedding and compare that TI-SID embedding to pre-stored TI-SID speaker embedding(s) for account(s) of the client device 101. If the TI-SID embedding is determined to satisfy a similarity threshold for a pre-stored speaker embedding of an account, the TI-SID module 142 can determine the spoken utterance is from a user corresponding to the account. Further, the TI-SID module 142 can determine whether that account is the same as the account for the user determined, by adaptation engine 115, to be currently engaging in hot word free interaction with the automated assistant. If so, the spoken utterance can be fully processed by the automated assistant and fulfilled. If not, the certain processing can be prevented and/or halted certain processing and/or fulfillment suppressed. For example, the TI-SID module 142 can prevent fulfillment module 138 from generating and/or provisioning a response if they are not the same. In these and other manners, it can be verified that the spoken utterance is provided by the same user that is determined to be engaging in hot word free interaction with the automated assistant 120. This can prevent inadvertently generating and/or provisioning of a response to a spoken utterance that is from a user (or other source) that is not the user determined to be engaging in hot word free interaction with the automated assistant 120. Although illustrated in FIG. 1 as being implemented at the cloud-based automated assistant component(s) 130, the TI-SID module 142 can optionally be implemented at the client device 101 as part of adaptation engine 115, and utilized in determining whether to adapt assistant function(s).

Figure 2:
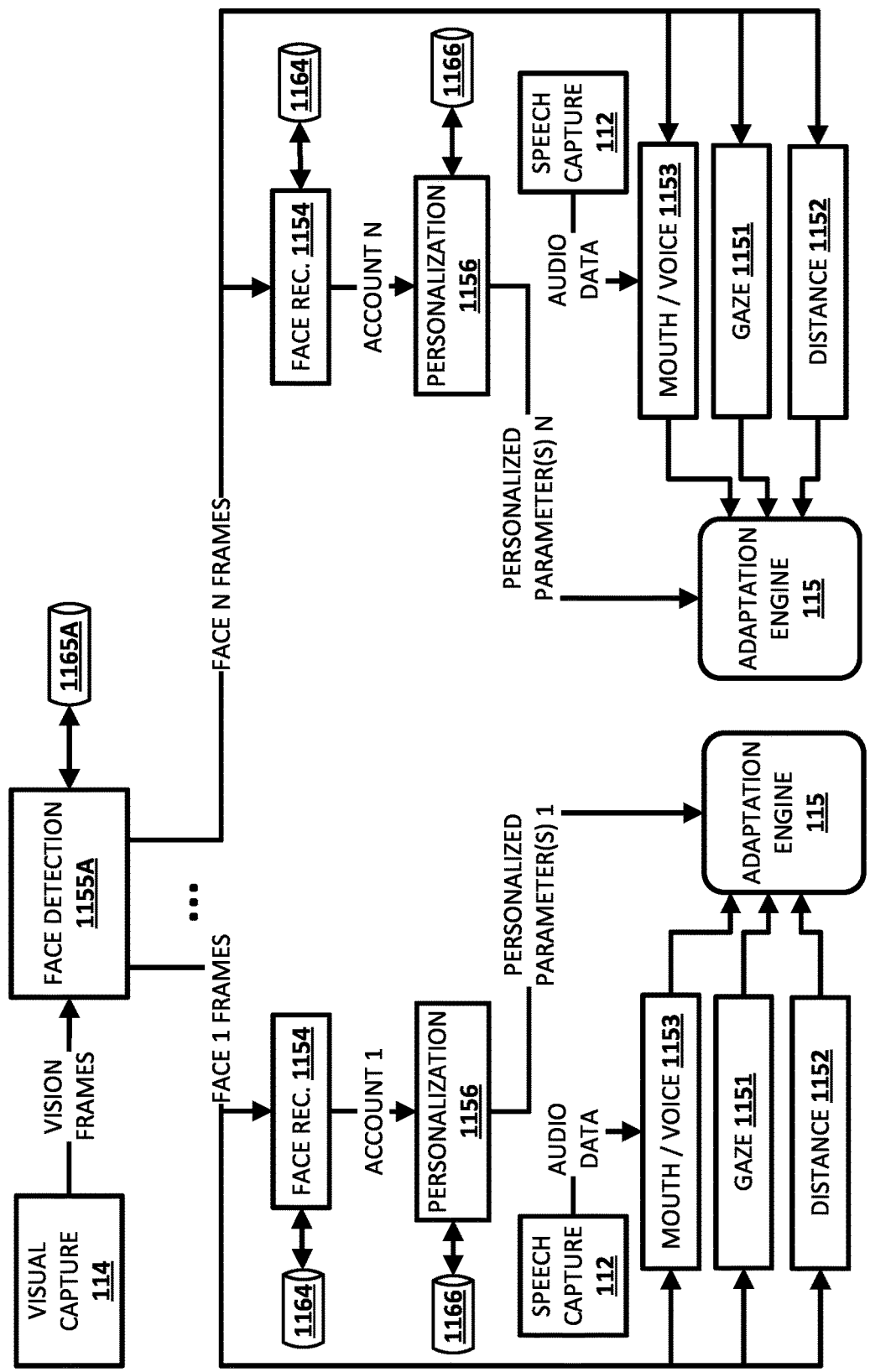
FIG. 2 depicts an example process flow that demonstrates various aspects of the present disclosure, in accordance with various implementations.

Referring now to FIG. 2, some component(s) of FIG. 1 are illustrated, along with example interaction(s) that can occur amongst those components. In FIG. 2, visual capture module 114 provides vision frames to a face detection module 1155A, which is an example module of other module(s) 1155 of FIG. 1. The face detection module 1155A utilizes a detection model 1165A, of other model(s) 1165 of FIG. 1, to detect face(s), if any, in each of the vision frame(s). The face detection module 1155A can track face(s) over each of multiple vision frames to determine that a face detected in a later vision frame corresponds to a corresponding face of an earlier frame. For each detected face in a vision frame, the face detection module 1155A can generate a corresponding cropped vision frame, that is a crop of the face, and provide the cropped vision frame to additional components. For example, in FIG. 2 "face 1 frames" indicates cropped vision frames that capture a first face and "face N frames" indicates cropped vision frames that capture an Nth face. As indicated by the horizontal ellipsis, additional cropped vision frames can be provided in situations where there are more than two detected faces. In implementations where there is only a single detected face, only the face 1 frames will be provided.

The face recognition module 1154 processes at least one of the face 1 frames and determines that a face, captured in the face 1 frames, corresponds to a first account registered with the assistant device 101 and provides, to personalization module 1156, an indication of the first account. In some implementations, if the face recognition module 1154 determines that a face captured by cropped vision frame(s) does not correspond to any registered account (e.g., an embedding generated based on the cropped vision frames does not satisfy a distance threshold relative to pre-stored embedding(s) of registered account(s)), then module(s) 1151, 1152, and/or 1153 can bypass performing any processing on such cropped vision frames. Put another way, in those implementations unrecognized face(s) are not processed in determining whether their corresponding user(s) are engaging in hot word free interaction with the automated assistant 120.

The personalization module 1156 uses the indication of the first account to identify, from personalized parameters storage 1166, first personalized parameter(s) that are stored in association with the first account. The personalization module 1156 provides the first personalized parameter(s) to the adaptation engine 115.

The gaze module 1151 processes the face 1 frames to generate gaze measure(s) and provides the gaze measure(s) to adaptation engine 115. The distance module 1152 processes the face 1 frames to generate distance measure(s) and provides the distance measure(s) to adaptation engine 115. The mouth/voice module 1153 processes the face 1 frames, and audio data captured by speech capture module 112, to generate active speech measure(s), and provides the active speech measure(s) to adaptation engine 115. It is noted that a stream of face 1 frames can be provided, based on a stream of vision frames, and continually processed by the modules 1151, 1152, and 1153 (optionally at different rates) to generate respective streams of measure(s) that are provided to the adaptation engine 115.

The adaptation engine 115 processes the gaze, distance, and active speech measures generated based on the face 1 frames in determining whether condition(s) are satisfied that indicate that the user (corresponding to the face 1 frames) is engaging in hot word free interaction with the automated assistant 120. In doing so, the adaptation engine 115 utilizes one or more parameter(s) in processing the measures. The parameter(s) include the first personalized parameter(s), provided by the personalization engine 1156, based on the measures being generated based on the face 1 frames. The parameter(s) can also optionally include default parameter(s) (e.g., for those parameter(s) not having a first personalized parameter counterpart). When the adaptation engine 115 determines the condition(s) are satisfied, the adaptation engine 115 can automatically adapt automated assistant processing as described herein.

The face recognition module 1154 also processes at least one of the face N frames and determines that a face, captured in the face N frames, corresponds to an Nth account registered with the assistant device 101 and provides, to personalization module 1156, an indication of the Nth account.

The personalization module 1156 uses the indication of the first account to identify, from personalized parameters storage 1166, Nth personalized parameter(s) that are stored in association with the Nth account. The personalization module 1156 provides the Nth personalized parameter(s) to the adaptation engine 115.

The gaze module 1151 processes the face N frames to generate gaze measure(s) and provides the gaze measure(s) to adaptation engine 115. The distance module 1152 processes the face N frames to generate distance measure(s) and provides the distance measure(s) to adaptation engine 115. The mouth/voice module 1153 processes the face N frames, and audio data captured by speech capture module 112, to generate active speech measure(s), and provides the active speech measure(s) to adaptation engine 115. It is noted that a stream of face N frames can be provided, based on a stream of vision frames, and continually processed by the modules 1151, 1152, and 1153 (optionally at different rates) to generate respective streams of measure(s) that are provided to the adaptation engine 115.

The adaptation engine 115 processes the gaze, distance, and active speech measures generated based on the face N frames in determining whether condition(s) are satisfied that indicate that another user (corresponding to the face N frames) is engaging in hot word free interaction with the automated assistant 120. In doing so, the adaptation engine 115 utilizes one or more parameter(s) in processing the measures. The parameter(s) include the Nth personalized parameter(s), provided by the personalization engine 1156, based on the measures being generated based on the face N frames. The parameter(s) can also optionally include default parameter(s) (e.g., for those parameter(s) not having an Nth personalized parameter counterpart). When the adaptation engine 115 determines the condition(s) are satisfied, the adaptation engine 115 can automatically adapt automated assistant processing as described herein.

Figure 3:
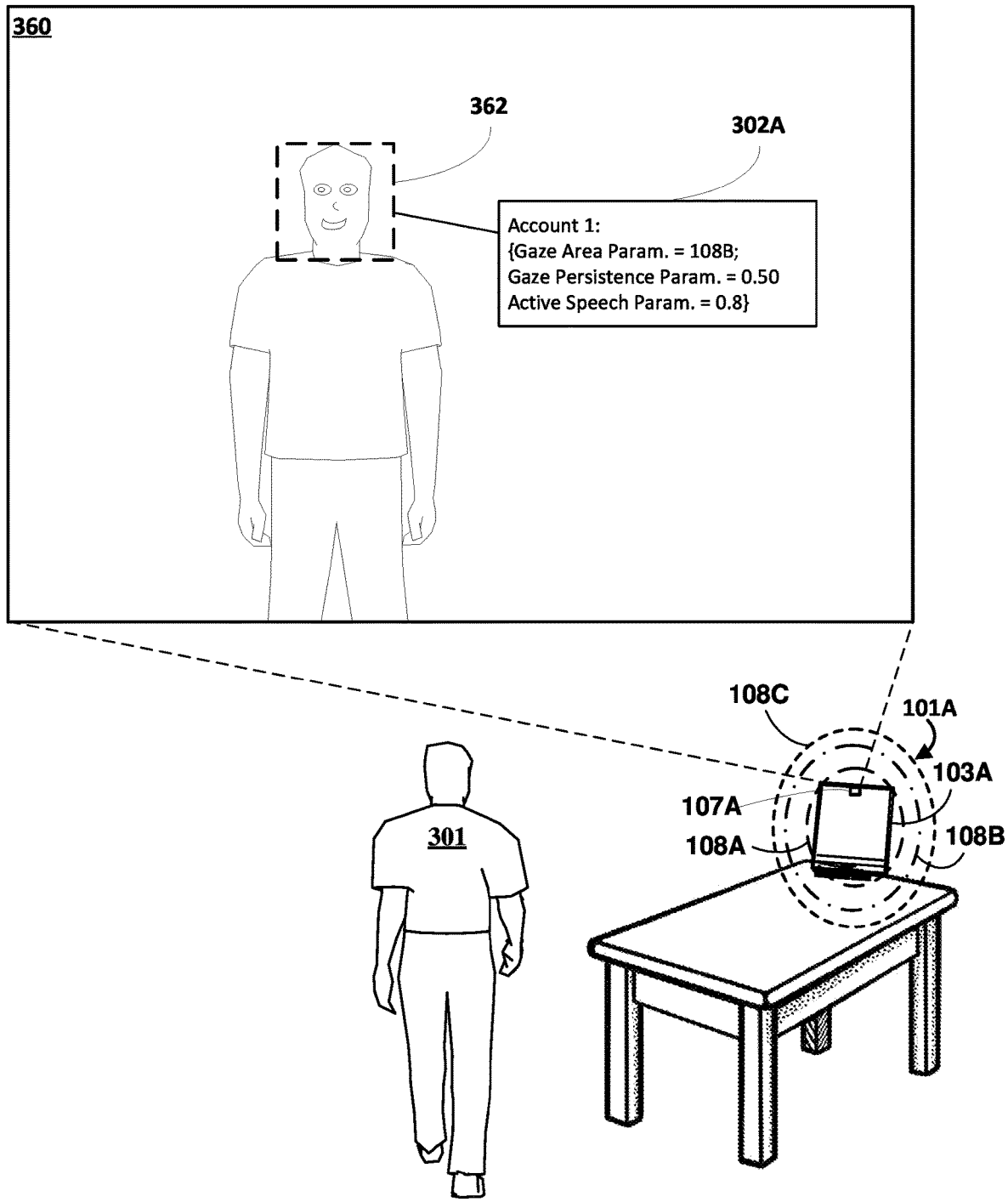
FIG. 3 depicts an example of an assistant device and a user, depicts an image captured by a camera of the assistant device, and illustrates three separate example gaze areas.

FIG. 3 depicts an example of client device 101, a display 103, and a vision component 107 of FIG. 1. In FIG. 3, the example client device is denoted as 101A, the example display 103 is denoted as 103A, and the example vision component 107 is denoted at 107A. The client device 101A can further include speaker(s) and microphone(s).

FIG. 3 also depicts examples of three separate gaze areas. A first gaze area is the area encompassed by first dashed ellipse 108A, a second gaze area is the area encompassed by second dashed ellipse 108B, and a third gaze area is the area encompassed by third dashed ellipse 108C. A default gaze area parameter can define the first gaze area, a personalized gaze area parameter for a first account can define the second gaze area, and a personalized gaze area parameter for a second account can define the third gaze area. Additional or alternative gaze areas can be defined, such as those having non-elliptical bounds. Moreover, in various implementations gaze area parameter(s) can be omitted and/or personalized gaze area parameter(s) can be omitted.

FIG. 3 also depicts a user 301 providing a gaze that is directed to the camera 107A. FIG. 3 also depicts an example image 360 captured by the camera 107A when the user is providing a directed gaze. In image 360, a bounding box 362 is provided and represents a region of the image that can be determined (e.g., by face detection module 1155A of FIG. 2) to correspond to a face. In some implementations, module(s) of adaptation engine 115 operating on client device 101A can process cropped images that correspond to the bounding box 362 portion of the image (or focus attention on that portion) in performing face recognition and/or in generating gaze, active speech, and/or distance measure(s). Although only a single image is depicted in FIG. 3, in various implementations generating various measures can be based on a sequence of images as described herein. Moreover, although only a single user is depicted in FIG. 3, multiple users could be captured in image(s) and in various implementations corresponding measures can be generated for each of the users and processed in determining whether the corresponding user is engaging in hot word free interaction with the automated assistant.

Also illustrated in FIG. 3 are example personalized parameters 302A that can be determined for the user. For example, face recognition module 1154 can determine that the face of the user matches a given registered account, and provide an indication of the given registered account to personalization module 1156. Personalization module 1156 can identify the personalized parameters 302A based on them being stored in association with the given registered account. As described herein, the adaptation engine 115 can utilize the personalized parameters 302A in processing measure(s) generated for the user 301, in determining whether certain condition(s) are satisfied that indicate the user 301 is engaging in hot word free interaction with the automated assistant.

The personalized parameters 302A include a gaze area parameter that corresponds to the second gaze area indicated by the second dashed ellipse 108B. The personalized parameters 302A also include a personalized gaze persistence parameter of 0.5 (e.g., 50% of N consecutive analyzed frames must indicate a gaze) and an active speech parameter of 0.8 (e.g., probability of active speech must be equal to or greater than 0.8).

Figure 4:
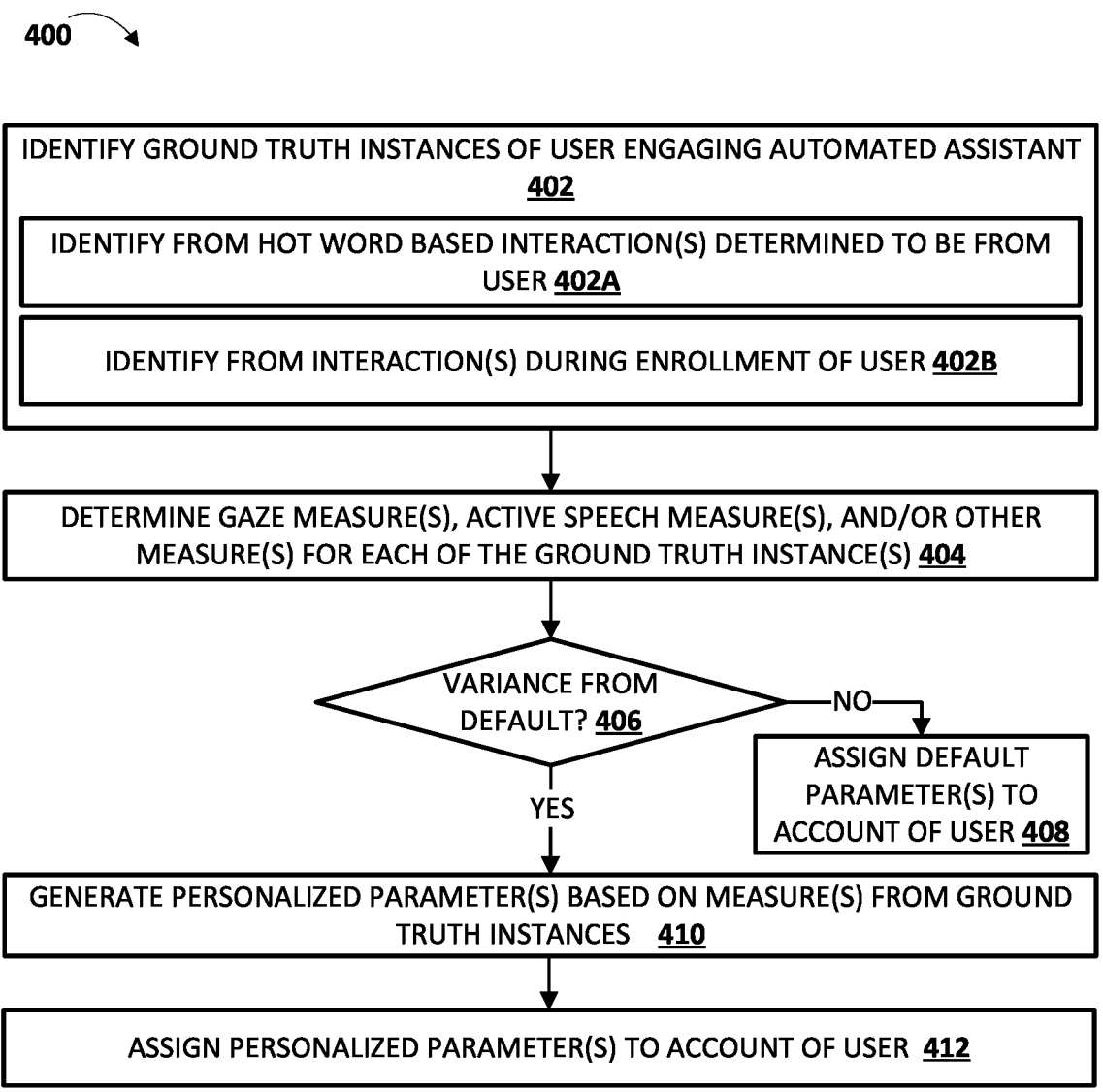
FIG. 4 is a flowchart illustrating an example method of at least selectively generating personalized parameter(s) for a user, and assigning the personalized parameter(s) to an account of the user.

Turning initially to FIG. 4, a method 400 is illustrated of at least selectively generating personalized parameter(s) for a user, and assigning the personalized parameter(s) to an account of the user. For convenience, the operations of the flow chart of FIG. 4 are described with reference to a system that performs the operations. This system can include various components of various computer systems, such as one or more components of computing system(s) that implement automated assistant 120 (e.g., a client device and/or remote computing system(s)). For example, personalization module 1156 can perform method 400 in various implementations. Moreover, while operations of the methods are shown in a particular order, this is not meant to be limiting. One or more operations may be reordered, omitted or added.

At block 402, the system identifies ground truth instances of a user. Each of the ground truth instances are of the user engaging an automated assistant, and they are identified based on being an instance of the user (as opposed to a different user) engaging the automated assistant. For example, the system can identify the instances based on them being ascribed to an account of the user. In some implementations, block 402 includes sub-block 402A and/or sub-block 402B.

At sub-block 402A, the system identifies ground truth instance(s) from hot word based interactions determined to be from the user. For example, a hot word based interaction can be ascribed to an account of the user based on text-dependent speaker verification, performed based on processing audio data from the interaction that captures the hot word, matching a text-dependent speaker embedding for the account. At sub-block 402B, the system identifies ground truth instance(s) from interaction(s) during enrollment of the user, such as an enrollment where an account for the user is being generated and/or in where an account for the user is being configured for hot word free interaction techniques described herein.

At block 404, the system determines gaze measure(s), active speech measure(s), and/or other measure(s) for each of the ground truth instances identified at block 402. For example, the system can process vision data and/or audio data from the ground truth instances to generate the measure(s). For instance, the system can process vision data from an instance to generate gaze measure(s) for the instance and can process the vision data from the instance along with temporally aligned audio data from the instance to generate active speech measure(s) for the instance.

At block 406, the system determines if any of the measure(s), generated at block 404, have significant variance from corresponding default parameters. For example, the system can determine whether any of the measure(s) has a statistically significant variance from the corresponding default parameters. For instance, the system can determine whether a median or mean of generated active speech measures varies from a default active speech threshold parameter by more than X or by more than Y %. Also, for instance, the system can determine whether a lower and/or upper standard deviation (e.g., one standard deviation, two standard deviations, or three standard deviations) of the generated active speech measures varies from a default active speech threshold parameter by more than X or by more than Y %.

If, at block 406, the system determines there is not significant variance for any of the measures, the system proceeds to block 408 where the default parameter(s) are assigned to an account of the user. If, at block 406, the system determines there is significant variance for at least one of the measures, the system proceeds to block 410. In some implementations, blocks 406 and 408 may be omitted (e.g., personalized parameters are determined for each account without selective utilization of default counterparts).

At block 410, the system generates one or more personalized parameter(s) based on the measure(s) from the ground truth instances, such as the measure(s) determined at block 406 to have significant variance. For example, the system can generate a personalized active speech threshold parameter as a function of the active speech measures generated from the ground truth instances. For instance, the system can generate a personalized active speech threshold parameter so that N standard deviations of the generated active speech measures would be considered active speech using the personalized active speech threshold.

At block 412, the system assigns the personalized parameter(s) to an account of the user. Optionally, default parameter(s) can be assigned to the account for any parameter(s) for which personalized parameter(s) are not generated. Personalized parameter(s) assigned to an account can later be used, for example, as described in block 612 of method 600 (described below) and/or as described elsewhere herein. Method 400 can be performed for each of multiple disparate users and disparate user accounts, thereby generating different personalized parameter(s) for different accounts.

Figure 5A:
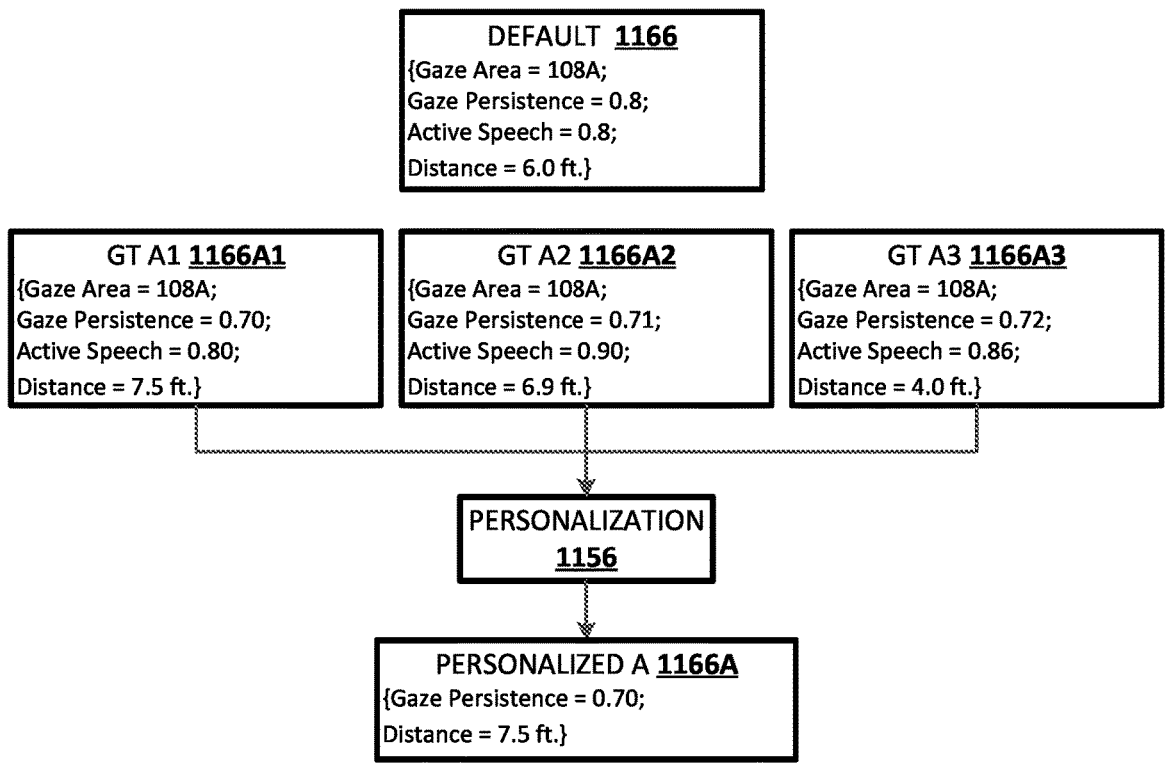
FIG. 5A depicts example default parameters, example generated measures from prior interactions of a first user with an automated assistant, and example personalized parameter(s) that can be generated, for the first user, based on the generated measures.
Figure 5B:
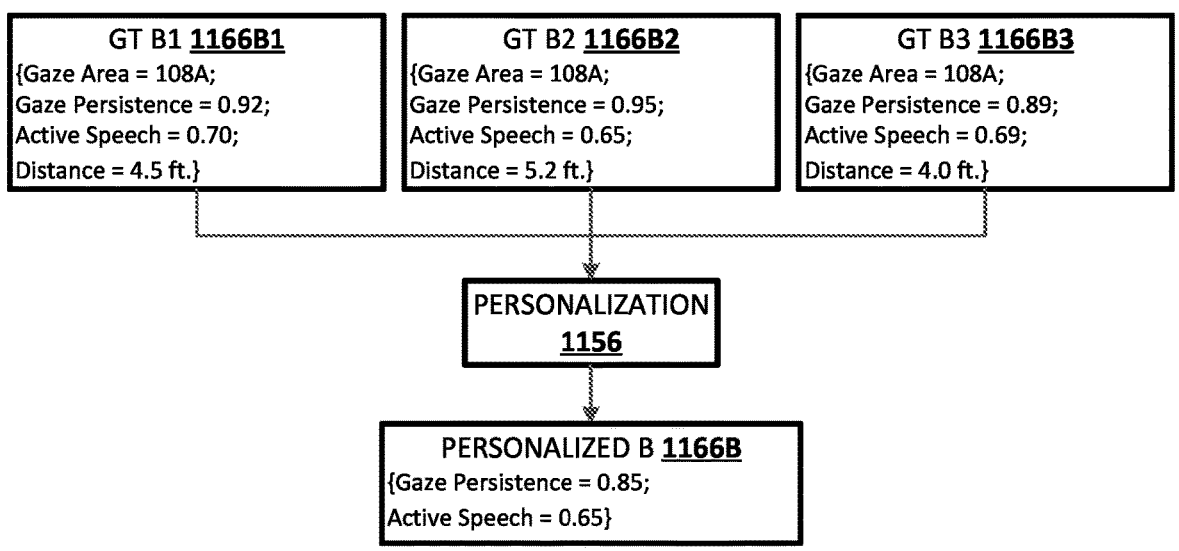
FIG. 5B depicts example generated measures from prior interactions of a second user with an automated assistant, and example personalized parameter(s) that can be generated, for the second user, based on the generated measures.

Turning briefly to FIGS. 5A and 5B, some particular examples of generating personalized parameters are described in further detail. In FIG. 5A, example default parameters 1166 are illustrated that include a default gaze area parameter (108A), a default gaze persistence parameter (0.80), a default active speech parameter (0.80), and a default distance parameter (6.0 ft.). In FIG. 5A, ground truth measures 1166A1, 1166A2, and 1166A3 for a first user are also illustrated, where each of the ground truth measures 1166A1, 1166A2, and 1166A3 is generated based on processing vision and/or audio data from a prior interaction of the first user with an automated assistant. For example, ground truth measures 1166A1 include a gaze area measure (108A), a gaze persistence measure (0.70), an active speech measure (0.80), and a distance measure (7.5 ft.) generated based on data from a prior interaction of the first user with the automated assistant.

The personalization module 1156 can process the ground truth measures 1166A1, 1166A2, and 1166A3 in determining whether to generate personalized parameter(s) for the first user and/or in generating any personalized parameter(s). For example, as illustrated by personalized parameter(s) 1166A, the personalization module 1156 can generate a personalized gaze persistence parameter (0.70) and a personalized distance parameter (7.5 ft) for the first user, while not generating personalized gaze area or personalized active speech parameters. The personalized parameter(s) 1166A can be stored in association with an account of the first user.

In generating the personalized gaze persistence parameter (0.69), the personalization module 1156 can determine 0.70 so as to encompass all generated active speech measures (0.70, 0.71, and 0.72) of ground truth measures 1166A1, 116A2, and 116A3, optionally omitting from consideration any statistical outlier(s) and/or optionally taking into account a minimum allowed value. In generating the personalized distance parameter (7.5 ft.), the personalization module 1156 can determine 7.5 ft so as to encompass all generated distance measures (7.5 ft., 6.9 ft., and 4.0 ft.) of ground truth measures 1166A1, 116A2, and 116A3, optionally omitting from consideration any statistical outlier(s) and/or optionally taking into account a maximum allowed value. Generation and subsequent utilization of the more permissive (relative to defaults) gaze persistence parameter and distance parameter can mitigate false-negative occurrences for the first user.

In determining to not generate personalized gaze area or personalized active speech parameters, the personalization module 1156 can determine to not generate them responsive to determining that corresponding measures, of ground truth measures 1166A1, 116A2, and 116A3, do not have sufficient variance from the default parameters 1166. For example, the gaze area measures, of the ground truth measures 1166A1, 1166A2, and 1166A3, are all the same as the gaze area parameter of default parameters 1166. Also, for example, the active speech measures, of the ground truth measures 1166A1, 116A2, and 116A3, are all greater than the active speech parameter threshold of default parameters 1166 (meaning active speech would have correctly been determined), while not being significantly higher.

In FIG. 5B, ground truth measures 1166B1, 1166B2, and 1166B3 for a second user are illustrated, where each of the ground truth measures 1166B1, 1166B2, and 1166B3 is generated based on processing vision and/or audio data from a prior interaction of the second user with an automated assistant. For example, ground truth measures 1166B1 include a gaze area measure (108B), a gaze persistence measure (0.92), an active speech measure (0.70), and a distance measure (4.5 ft.) generated based on data from a prior interaction of the first user with the automated assistant.

The personalization module 1156 can process the ground truth measures 1166B1, 1166B2, and 1166B3 in determining whether to generate personalized parameter(s) for the second user and/or in generating any personalized parameter(s). For example, as illustrated by personalized parameter(s) 1166B, the personalization module 1156 can generate a personalized gaze persistence parameter (0.85) and a personalized active speech parameter (0.65) for the second user, while not generating personalized gaze area or personalized distance parameters. The personalized parameter(s) 1166B can be stored in association with an account of the second user.

In generating the personalized gaze persistence parameter (0.85), the personalization module 1156 can determine 0.85 so as to encompass all generated gaze persistence measures (0.92, 0.95, and 0.89) of ground truth measures 1166B1, 1166B2, and 1166B3, while being some degree lower (0.06 in this instance) than a lowest (0.89) of the generated gaze persistence measures. It is noted that the personalized gaze persistence parameter (0.85) is more restrictive than the default (0.80), which can result in mitigation of occurrences of false positives for the second user. In generating the personalized active speech parameter (0.65), the personalization module 1156 can determine 0.65 so as to encompass all generated active speech measures (0.70, 0.65, and 0.69) of ground truth measures 1166B1, 1166B2, and 1166B3. The personalized active speech parameter (0.65) is more permissive than the default (0.80), which can result in mitigation of occurrences of false negatives for the second user.

In determining to not generate personalized gaze area or personalized distance parameters, the personalization module 1156 can determine to not generate them responsive to determining that corresponding measures, of ground truth measures 1166B1, 116B2, and 116B3, do not have sufficient variance from the default parameters 1166.

Figure 6:
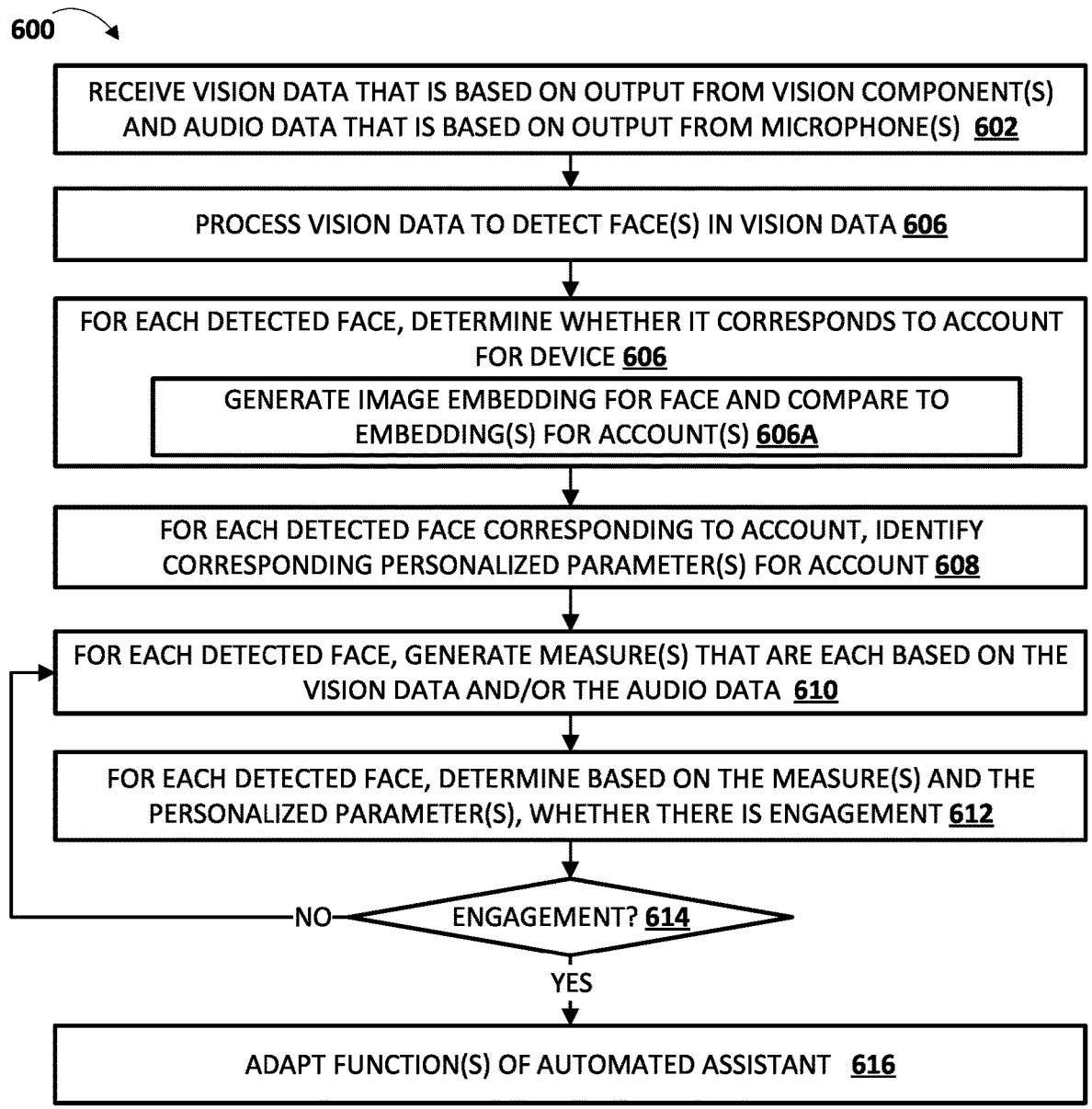
FIG. 6 is a flowchart illustrating an example method of utilizing personalized parameter(s) in determining whether a user is engaging in hot word free interaction with the automated assistant.

FIG. 6 is a flowchart illustrating an example method 600 of utilizing personalized parameter(s) in determining whether a user is engaging in hot word free interaction with the automated assistant. For convenience, the operations of the flow chart of FIG. 6 are described with reference to a system that performs the operations. This system can include various components of various computer systems, such as one or more components of computing system(s) that implement automated assistant 120 (e.g., a client device and/or remote computing system(s)). Moreover, while operations of the methods are shown in a particular order, this is not meant to be limiting. One or more operations may be reordered, omitted or added.

At block 602, the system receives vision data that is based on output from vision component(s) of an assistant device and audio data that is based on output from microphone(s) of the assistant device.

At block 604, the system processes the vision data to detect face(s) in the vision data.

At block 606, the system determines, for each detected face, whether the face corresponds to an account for the device. In some implementations, block 606 includes sub-block 606A in which the system, in determining whether a face corresponds to an account, generates an image embedding for the face and compares it to face embedding(s) for each of the accounts for the device. For example, if the comparison to a given face embedding satisfies a threshold, the system can determine the face corresponds to the account corresponding to the given face embedding. The system can generate the image embedding for the face by processing vision data frame(s) that capture the face. The face embedding(s) for each account can be generated based on image(s) of the user associated with the account.

At block 608, for each detected face determined to correspond to an account, the system identifies corresponding personalized parameter(s), if any, for the account. For example, if a first face is determined to correspond to a first account and a second face is determined to correspond to a second account, the system can identify first personalized parameter(s) for the first account and second personalized parameter(s) for the second account.

At block 610, for each detected face the system generates measure(s) that are each based on the vision data and/or the audio data. For example, for a first detected face, the system can generate first gaze measure(s) based on first vision data frame(s) that capture the first face (e.g., that are each a crop of the first face) and generate first active speech measure(s) based on such first vision data frames and, optionally, temporally correlated audio data frames. Also, for example, for a second detected face, the system can generate second gaze measure(s) based on second vision data frame(s) that capture the second face (e.g., that are each a crop of the second face) and generate second active speech measure(s) based on such second vision data frames and, optionally, temporally correlated audio data frames At block 612, the system determines, for each detected face, whether there is engagement. The system determines whether there is engagement for a face based on the measure(s), generated at block 610, for the face and based on the personalized parameter(s) identified at block 608. For example, in determining whether there is engagement for a first face, first gaze measure(s) can be compared to personalized gaze parameter(s) for an account determined to correspond to the first face. For instance, the system can compare the first gaze measure(s) to the personalized gaze parameter(s) to determine whether the first user's gaze is directed at the assistant device and, optionally, whether it is persistently directed at the assistant device. Determining that there is engagement for the first face can be contingent on determining that the first user's gaze is directed at the assistant device and, optionally, is persistently directed at the assistant device. Optionally, the system can additionally utilize one or more default parameter(s), for one or more measures, in determining whether there is engagement.

At block 614, if the system determined, at a most recent iteration block 612, that there is engagement, the system proceeds to block 616. If not, the system can proceed back to block 610 to generate additional measure(s) based on newly detected additional vision data and/or additional audio data, then proceed again to block 612. This general process can continue until engagement is determined and/or other condition(s) are satisfied (e.g., if presence of person(s) is no longer detected, method 600 can halt).

At block 616, the system adapts one or more function(s) of an automated assistant based on determining the engagement. The adaptation of the function(s) can, in various implementations, include initiating certain automated assistant processing that, prior to adaptation, was dormant. For example, the function(s) that are adapted can include the initiation of automatic speech recognition (ASR) (e.g., local ASR at the assistant device), natural language understanding (NLU) (e.g., NLU at the assistant device and/or at remote server(s) based on ASR results from local ASR), fulfillment based on the ASR and/or NLU results (e.g., at the assistant device and/or remote servers), and/or transmission of data to remote server(s) (e.g., transmission of ASR results, audio data, and/or vision data).

Figure 6A:
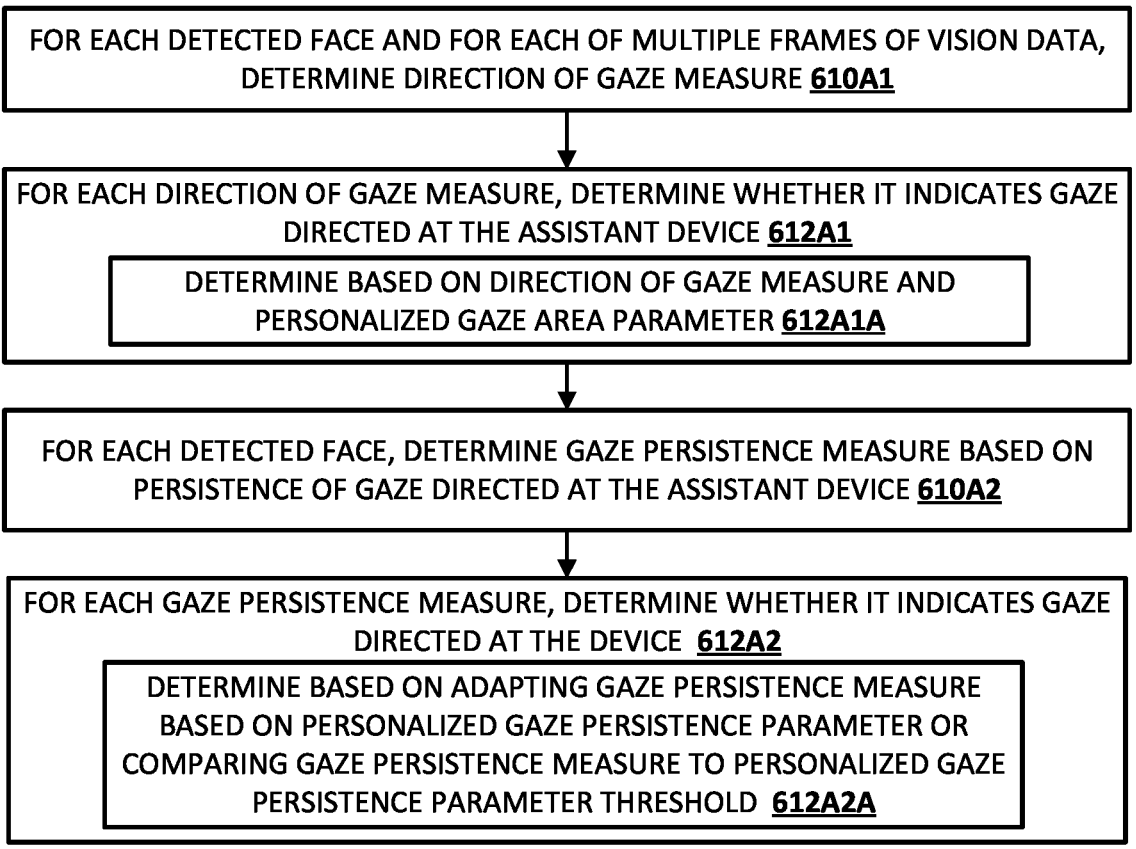
FIG. 6A depicts a flowchart illustrating an example of performing all or aspects of blocks 610 and 612 of FIG. 6.
Figure 6B:
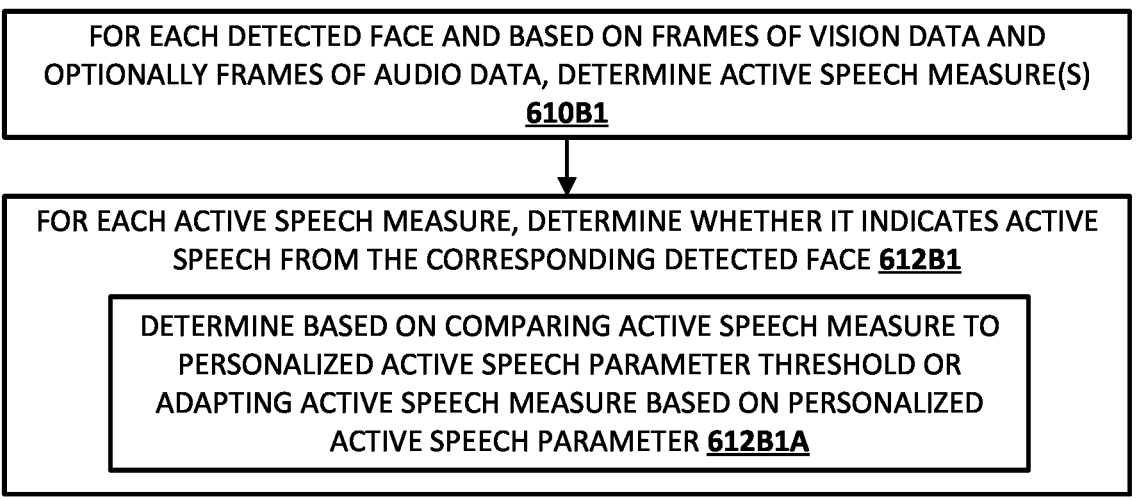
FIG. 6B depicts a flowchart illustrating another example of performing all or aspects of blocks 610 and 612 of FIG. 6.

Turning now to FIGS. 6A and 6B, FIG. 6A depicts a flowchart illustrating an example of performing all or aspects of blocks 610 and 612 of FIG. 6 and FIG. 6B depicts a flowchart illustrating another example of performing all or aspects of blocks 610 and 612 of FIG. 6. Although illustrated separately, in some implementations blocks of 6A and blocks of 6B can both be performed (e.g., in parallel) in performing blocks 610 and 612 of FIG. 6. Further, in various implementations, block 610 can include generating additional or alternative measure(s) than those of FIGS. 6A and 6B, and block 612 can include considering such additional or alternative measure(s) (and optionally corresponding personalized parameter(s)) in determining whether there is engagement. For example, distance measure(s) can additionally be determined in block 610 and considered in block 612.

In FIG. 6A, blocks 610A1 and 610A2 are examples of aspect(s) of block 610, and blocks 612A1 and 612A2 are examples of aspect(s) of block 612.

At block 610A1, the system determines, for each detected face and for each of multiple frames of vision data, a direction of gaze measure.

At block 612A1, the system determines, for each direction of gaze measure, whether it indicates gaze directed at the assistant device. In some implementations, block 612A1 includes sub-block 612A1A in which the system determines whether a direction of gaze measure, for a face, indicates gaze directed at the device based on the direction of gaze measure and a personalized gaze area parameter for the face. For example, the direction of gaze and, optionally, a distance of the corresponding user from the camera, can be used to determine if the gaze in the image is directed within a gaze area that is defined by a personalized gaze area parameter assigned to an account of the user.

At block 610A2, the system determines, for each detected face, a gaze persistence measure based on persistence of the gaze, of the face, directed at the assistant device. The system can determine the gaze persistence measure based on a quantity of vision frames for which a gaze directed at the device was determined for the face and/or based on a duration of a gaze being determined for the face. For example, via iteration(s) of block 612A1 it can be determined that, for a given face, nine of ten consecutive analyzed frames are determined to have a gaze of the face directed at the assistant device. In such an example, the system can determine a gaze persistence measure of 0.90 for the given face.

At block 612A2, the system determines, for each gaze persistence measure, whether it indicates gaze directed at the assistant device. For example, the system can compare the gaze persistence measure to a gaze persistence measure threshold, and determine gaze is directed at the assistant device only if the gaze persistence measure satisfies the gaze persistence measure threshold. In some implementations, block 612A2 includes sub-block 612A2A. At sub-block 612A2A, the system makes the determination of block 612A2 using a personalized parameter. For example, the system can adapt the gaze persistence measure, based on a personalized gaze persistence parameter, and compare the adapted gaze persistence measure to the gaze persistence measure threshold in making the determination. For instance, the gaze persistence measure can be boosted or reduced, based on the personalized gaze persistence parameter. As another example, the system can instead compare the gaze persistence measure to a personalized gaze persistence measure threshold.

In FIG. 6B, blocks 610B1 is an example of aspect(s) of block 610, and block 612B1 is an example of aspect(s) of block 612.

At block 610B1, the system determines, for each detected face and based on frames of vision data and optionally frames of audio data, active speech measure(s).

At block 612B1, the system determines, for each active speech measure, whether it indicates active speech from the corresponding detected face. In some implementations, block 612B1 includes sub-block 612B1A in which: the system determines whether an active speech measure, for a face, indicates active speech based on comparing the active speech measures to a personalized active speech threshold or, alternatively, the system adapts (e.g., boosts or reduces) the active speech measure based on a personalized active speech parameter, and compares the adapted active speech measure to a default active speech threshold.

Figure 7:
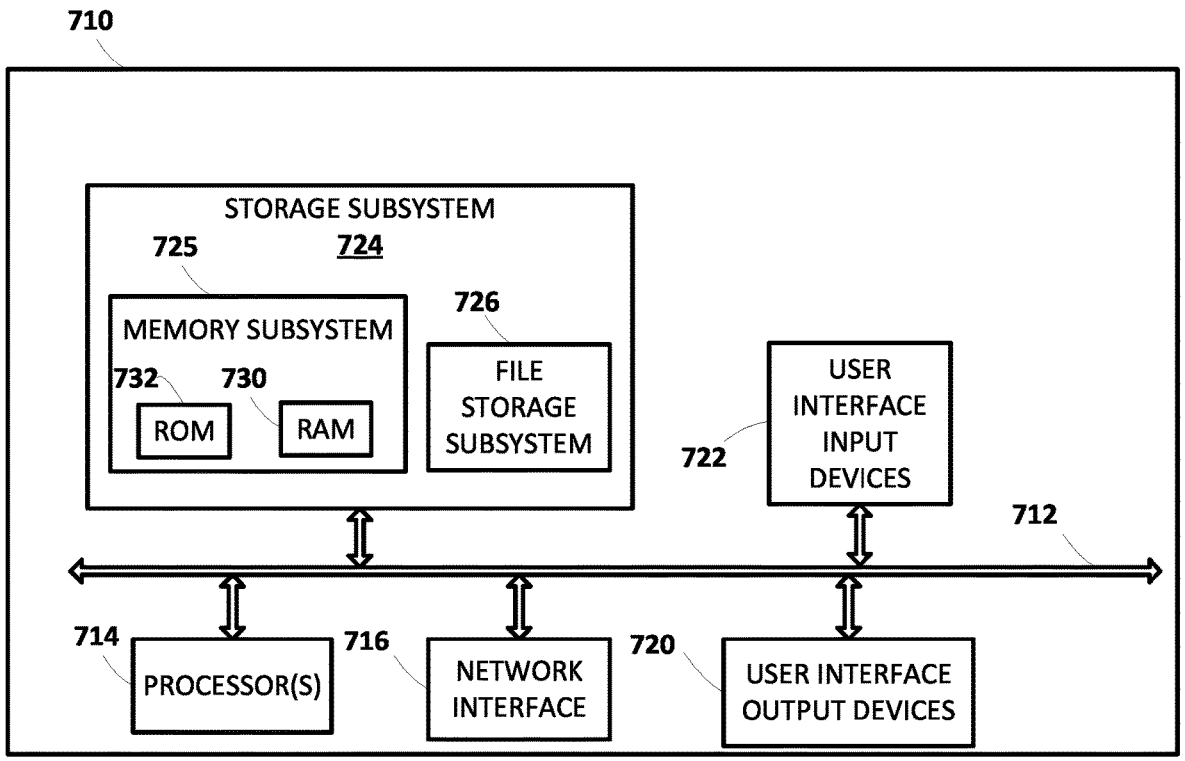
FIG. 7 illustrates an example architecture of a computing device.

FIG. 7 is a block diagram of an example computing device 710 that may optionally be utilized to perform one or more aspects of techniques described herein. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 4, 6, 6A, and/or 6B, as well as to implement various components depicted in FIGS. 1, 2A, 2B, and 3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, users can opt out of assistant devices using vision component 107 and/or using vision data from vision component 107 in enabling hot word free interaction with an automated assistant.

In some implementations a method implemented by one or more processors is provided and includes determining, based on processing at least one image frame generated by a camera of the client device, that a face, of a user and that is captured by the at least one image frame, corresponds to an account registered with the client device. The method further includes identifying, for the account registered with the client device, one or more personalized parameters to utilize in determining whether the user is engaging in hot word free interaction with an automated assistant of the client device. The method further includes generating one or more measures for the user based on processing a plurality of image frames generated by the camera. The plurality of image frames include the face of the user and include or are in addition to the at least one image frame. The method further includes, in response to determining that the face corresponds to the account registered with the client device: using the one or more personalized parameters along with the one or more measures in determining whether the user is engaging in hot word free interaction with the automated assistant. The method further includes, when it is determined that the user is engaging in hot word free interaction with the automated assistant: automatically adapting processing performed by the automated assistant.

These and other implementations of the technology disclosed herein can include one or more of the following features.

In some implementations, the one or more personalized parameters include a personalized threshold. In some of those implementations, using the personalized parameters along with the one or more measures in determining whether the user is engaging in hot word free interaction with the automated assistant includes: comparing a measure, of the one or more measures, to the personalized threshold in determining whether the user is engaging in the hot word free interaction with the automated assistant.

In some implementations, the one or more personalized parameters include a personalized measure adjustment. In some of those implementations, using the personalized parameters along with the one or more measures in determining whether the user is engaging in hot word free interaction with the automated assistant includes: adjusting a given measure, of the one or more measures, according to the personalized measure adjustment, to generate an adjusted measure; and using the adjusted measure in determining whether the user is engaging in the hot word free interaction with the automated assistant.

In some implementations, generating the one or more measures for the user based on processing the plurality of image frames generated by the camera includes generating, based on one image of the plurality of images, a gaze direction for eyes of the face captured in the one image. In some of those implementations, using the one or more personalized parameters along with the one or more measures in determining whether the user is engaging in hot word free interaction with the automated assistant includes: determining, based on the gaze direction and using at least one of the personalized parameters, whether the gaze direction is directed towards the device; and using the determination of whether the gaze direction is directed towards the device in determining whether the user is engaging in hot word free interaction with the automated assistant.

In some implementations, generating the one or more measures for the user based on processing the plurality of image frames generated by the camera includes generating, based on multiple of the plurality of images, an active speech measure that indicates whether the user is actively speaking. In some versions of those implementations, using the personalized parameters along with the one or more measures in determining whether the user is engaging in hot word free interaction with the automated assistant includes: comparing the active speech measure to a personalized threshold, of the personalized parameters, in determining whether the user is engaging in the hot word free interaction with the automated assistant. In some of those versions, generating the active speech measure is further based on processing, along with the multiple of the plurality of images, audio data frames that temporally correspond to the multiple of the plurality of images.

In some implementations, the method further includes, prior to determining that the face corresponds to the account registered with the client device: automatically generating the one or more personalized parameters based on measures generated based on one or more prior interactions with the automated assistant. The one or more prior interactions are utilized based on being determined to have been performed by the user. In some versions of those implementations, the method further includes identifying one or more of the prior interactions based on them each being initiated, by the user, by speaking a hot word for invoking the automated assistant. In some versions of those implementations, the method further additionally or alternatively includes identifying one or more of the prior interactions based on them each being a hot word free interaction that was verified as intended based on further user interface input from the user. In some versions of those implementations, the method further additionally or alternatively includes identifying one or more of the prior interactions based on them each being performed during an enrollment procedure for the user.

In some implementations a method implemented by one or more processors is provided and includes identifying interactions that are each between a particular user and an automated assistant. The method further includes, for each of the interactions: generating a respective gaze measure based on processing respective image frames from the interaction. The method further includes generating, based on the respective gaze measures, a personalized gaze parameter for the particular user. The method further includes storing the personalized gaze parameter in association with an account of the particular user. The method further includes, subsequent to storing the personalized gaze parameter in association with the account of the particular user: determining, based on processing at least one image frame generated by a camera of a client device, that a face, of the particular user and that is captured by the at least one image frame, corresponds to the account; generating a gaze measure for the user based on processing at least the image frame or an additional image frame generated by the camera; and in response to determining that the face corresponds to the account: using the personalized gaze parameter, stored in association with the account, along with the gaze measure in determining whether the particular user is engaging in hot word free interaction with the automated assistant. The method further includes, when it is determined that the particular user is engaging in hot word free interaction with the automated assistant, automatically adapting processing performed by the automated assistant.

These and other implementations of the technology disclosed herein can include one or more of the following features.

In some implementations, the personalized gaze parameter reflects a gaze area for the user when interacting with the automated assistant. In some versions of those implementations, the gaze measure is a direction of a gaze of the user. In some of those versions, using the personalized gaze parameter along with the gaze measure in determining whether the user is engaging in hot word free interaction with the automated assistant includes: determining, based on the direction of gaze, whether the gaze is directed to the gaze area reflected by the personalized gaze parameter; and determining, in dependence on whether the gaze is directed to the gaze area, whether the user is engaging in hot word free interaction with the automated assistant.

In some implementations, the personalized gaze parameter reflects gaze persistence for the user when interacting with the automated assistant, and the gaze measure reflects current gaze persistence. In some of those implementations, using the personalized gaze parameter along with the gaze measure in determining whether the user is engaging in hot word free interaction with the automated assistant includes: determining, based on comparing the gaze measure to the personalized gaze parameter, whether the gaze is persistently directed to the client device; and determining, in dependence on whether the gaze is persistently directed to the client device, whether the user is engaging in hot word free interaction with the automated assistant.

In some implementations, determining whether the particular user is engaging in hot word free interaction with the automated assistant is further based on an active speech measure generated based on processing one or more images frames generated by the camera. In some of those implementations, the active speech measure is further based on processing, along with the one or more image frames, temporally corresponding audio data frames.

In some implementations, determining whether the particular user is engaging in hot word free interaction with the automated assistant is further based on a distance measure, of the particular user relative to the client device, generated based on processing one or more images frames generated by the camera.

In some implementations a method implemented by one or more processors is provided and includes identifying interactions that are each between a particular user and an automated assistant. The method further includes, for each of the interactions, generating a respective active speech measure based on processing respective image data and audio data from the interaction. The method further includes generating, based on the respective active speech measures, a personalized active speech parameter for the particular user. The method further includes storing the personalized active speech parameter in association with an account of the particular user. The method further includes, subsequent to storing the personalized active speech parameter in association with the account of the particular user: determining, based on processing at least one image frame generated by a camera of a client device, that a face, of the particular user and that is captured by the at least one image frame, corresponds to the account; generating a current active speech measure for the particular user based on processing a plurality of images, generated by the camera, along with temporally corresponding audio data; in response to determining that the face corresponds to the account: using the personalized active speech parameter, stored in association with the account, along with the active speech measure in determining whether the particular user is engaging in hot word free interaction with the automated assistant. The method further includes, when it is determined that the particular user is engaging in hot word free interaction with the automated assistant: automatically adapting processing performed by the automated assistant.

These and other implementations of the technology disclosed herein can include one or more of the following features.

In some implementations, the personalized active speech parameter is a threshold. In some of those implementations, using the personalized active speech parameter along with the active speech measure in determining whether the particular user is engaging in hot word free interaction with the automated assistant, includes: comparing the active speech measure to the threshold in determining whether the particular user is engaging in hot word free interaction with the automated assistant.

What is claimed is:

1. A method implemented by one or more processors of a client device, the method comprising:
    determining, based on processing at least one image frame generated by a camera of the client device, that a face, of a user and that is captured by the at least one image frame, corresponds to an account registered with the client device;
    identifying, in response to determining that the face of the user that is captured by the at least one image frame corresponds to the account registered with the client device, and for the account registered with the client device, one or more personalized parameters, for the user, to be utilized in determining whether the user is engaging in hot word free interaction with an automated assistant of the client device, wherein one or more of the personalized parameters for the user are more permissive than one or more additional personalized parameters for an additional user, and wherein the personalized parameters comprise one or more of: a personalized gaze area parameter, a personalized gaze persistence parameter, a personalized active speech parameter, and/or a personalized distance parameter;
    generating one or more measures for the user based on processing a plurality of image frames generated by the camera, wherein the plurality of image frames include the face of the user and include or are in addition to the at least one image frame;
    in response to determining that the face corresponds to the account registered with the client device:
        using the one or more personalized parameters along with the one or more measures in determining whether the user is engaging in hot word free interaction with the automated assistant; and
        when it is determined that the user is engaging in hot word free interaction with the automated assistant:
            automatically adapting processing performed by the automated assistant.

2. The method of claim 1, wherein the one or more personalized parameters include a personalized threshold, and wherein using the personalized parameters along with the one or more measures in determining whether the user is engaging in hot word free interaction with the automated assistant comprises:
    comparing a measure, of the one or more measures, to the personalized threshold in determining whether the user is engaging in the hot word free interaction with the automated assistant.

3. The method of claim 1, wherein the one or more personalized parameters include a personalized measure adjustment, and wherein using the personalized parameters along with the one or more measures in determining whether the user is engaging in hot word free interaction with the automated assistant comprises:
    adjusting a given measure, of the one or more measures, according to the personalized measure adjustment, to generate an adjusted measure; and
    using the adjusted measure in determining whether the user is engaging in the hot word free interaction with the automated assistant.

4. The method of claim 1,
    wherein generating the one or more measures for the user based on processing the plurality of image frames generated by the camera comprises:
        generating, based on one image of the plurality of images, a gaze direction for eyes of the face captured in the one image; and
    wherein using the one or more personalized parameters along with the one or more measures in determining whether the user is engaging in hot word free interaction with the automated assistant comprises:
        determining, based on the gaze direction and using at least one of the personalized parameters, whether the gaze direction is directed towards the client device; and
        using the determination of whether the gaze direction is directed towards the client device in determining whether the user is engaging in hot word free interaction with the automated assistant.

5. The method of claim 1, wherein generating the one or more measures for the user based on processing the plurality of image frames generated by the camera comprises:
    generating, based on multiple of the plurality of images, an active speech measure that indicates whether the user is actively speaking; and
    wherein using the personalized parameters along with the one or more measures in determining whether the user is engaging in hot word free interaction with the automated assistant comprises:
        comparing the active speech measure to a personalized threshold, of the personalized parameters, in determining whether the user is engaging in the hot word free interaction with the automated assistant.

6. The method of claim 5, wherein generating the active speech measure is further based on processing, along with the multiple of the plurality of images, audio data frames that temporally correspond to the multiple of the plurality of images.

7. The method of claim 1, further comprising, prior to determining that the face corresponds to the account registered with the client device:
    automatically generating the one or more personalized parameters based on measures generated based on one or more prior interactions with the automated assistant, wherein the one or more prior interactions are utilized based on being determined to have been performed by the user.

8. The method of claim 7, further comprising:
    identifying one or more of the prior interactions based on them each being initiated, by the user, by speaking a hot word for invoking the automated assistant.

9. The method of claim 7, further comprising:
identifying one or more of the prior interactions based on them each being a hot word free interaction that was verified as intended based on further user interface input from the user.

10. The method of claim 7, further comprising:
identifying one or more of the prior interactions based on them each being performed during an enrollment procedure for the user.

11. A client device comprising:
a camera;
memory storing instructions;
one or more processors operable to execute the instructions to:
determine, based on processing at least one image frame generated by the camera, that a face, of a user and that is captured by the at least one image frame, corresponds to an account registered with the client device;
identify, in response to determining that the face of the user that is captured by the at least one image frame corresponds to the account registered with the client device, and for the account registered with the client device, one or more personalized parameters, for the user, to be utilized in determining whether the user is engaging in hot word free interaction with an automated assistant of the client device, wherein one or more of the personalized parameters for the user are more permissive than one or more additional personalized parameters for an additional user, and wherein the personalized parameters comprise one or more of: a personalized gaze area parameter, a personalized gaze persistence parameter, a personalized active speech parameter, and/or a personalized distance parameter;
generate one or more measures for the user based on processing a plurality of image frames generated by the camera, wherein the plurality of image frames include the face of the user and include or are in addition to the at least one image frame;
in response to determining that the face corresponds to the account registered with the client device:
use the one or more personalized parameters along with the one or more measures in determining whether the user is engaging in hot word free interaction with the automated assistant; and
when it is determined that the user is engaging in hot word free interaction with the automated assistant:
automatically adapt processing performed by the automated assistant.

12. The client device of claim 11, wherein the one or more personalized parameters include a personalized threshold, and wherein in using the personalized parameters along with the one or more measures in determining whether the user is engaging in hot word free interaction with the automated assistant, one or more of the processors are to:
compare a measure, of the one or more measures, to the personalized threshold in determining whether the user is engaging in the hot word free interaction with the automated assistant.

13. The client device of claim 11, wherein the one or more personalized parameters include a personalized measure adjustment, and wherein in using the personalized parameters along with the one or more measures in determining whether the user is engaging in hot word free interaction with the automated assistant one or more of the processors are to:
adjust a given measure, of the one or more measures, according to the personalized measure adjustment, to generate an adjusted measure; and
use the adjusted measure in determining whether the user is engaging in the hot word free interaction with the automated assistant.

14. The client device of claim 11,
wherein in generating the one or more measures for the user based on processing the plurality of image frames generated by the camera one or more of the processors are to:
generate, based on one image of the plurality of images, a gaze direction for eyes of the face captured in the one image; and
wherein in using the one or more personalized parameters along with the one or more measures in determining whether the user is engaging in hot word free interaction with the automated assistant one or more of the processors are to:
determine, based on the gaze direction and using at least one of the personalized parameters, whether the gaze direction is directed towards the device; and
use the determination of whether the gaze direction is directed towards the client device in determining whether the user is engaging in hot word free interaction with the automated assistant.

15. The client device of claim 11, wherein in generating the one or more measures for the user based on processing the plurality of image frames generated by the camera, one or more of the processors are to:
generate, based on multiple of the plurality of images, an active speech measure that indicates whether the user is actively speaking; and
wherein in using the personalized parameters along with the one or more measures in determining whether the user is engaging in hot word free interaction with the automated assistant one or more of the processors are to:
compare the active speech measure to a personalized threshold, of the personalized parameters, in determining whether the user is engaging in the hot word free interaction with the automated assistant.

16. The client device of claim 15, wherein generating the active speech measure is further based on processing, along with the multiple of the plurality of images, audio data frames that temporally correspond to the multiple of the plurality of images.

17. The client device of claim 11, wherein one or more of the processors are further operable to execute the instructions to, prior to determining that the face corresponds to the account registered with the client device:
automatically generate the one or more personalized parameters based on measures generated based on one or more prior interactions with the automated assistant, wherein the one or more prior interactions are utilized based on being determined to have been performed by the user.

18. The client device of claim 17, wherein one or more of the processors are further operable to execute the instructions to:
identify one or more of the prior interactions based on them each being initiated, by the user, by speaking a hot word for invoking the automated assistant.

19. The client device of claim 17, wherein one or more of the processors are further operable to execute the instructions to:

identify one or more of the prior interactions based on them each being a hot word free interaction that was verified as intended based on further user interface input from the user.

20. The client device of claim 17, wherein one or more of the processors are further operable to execute the instructions to:

identify one or more of the prior interactions based on them each being performed during an enrollment procedure for the user.

* * * * *